US011082789B1

(12) United States Patent
Mimilakis et al.

(10) Patent No.: US 11,082,789 B1
(45) Date of Patent: Aug. 3, 2021

(54) AUDIO PRODUCTION ASSISTANT FOR STYLE TRANSFERS OF AUDIO RECORDINGS USING ONE-SHOT PARAMETRIC PREDICTIONS

(71) Applicant: Adobe Inc., San Jose, CA (US)

(72) Inventors: Stylianos Ioannis Mimilakis, Thuringia (DE); Paris Smaragdis, Urbana, IL (US); Nicholas Bryan, Belmont, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/931,505

(22) Filed: May 13, 2020

(51) Int. Cl.
*H04S 1/00* (2006.01)
*G06N 20/00* (2019.01)
*G06F 3/16* (2006.01)

(52) U.S. Cl.
CPC .............. *H04S 1/007* (2013.01); *G06F 3/165* (2013.01); *G06N 20/00* (2019.01)

(58) Field of Classification Search
CPC .................................. G06F 3/16; G06F 3/165
See application file for complete search history.

(56) References Cited

U.S. PATENT DOCUMENTS

2019/0196777 A1* 6/2019 Kovacevic .............. G06F 16/65
2020/0286499 A1* 9/2020 Duong .................. G10L 21/003
2021/0049989 A1* 2/2021 Bretan ................. G06N 3/0454

OTHER PUBLICATIONS

Adobe Systems, Adobe Audition CC 2019, https://www.adobe.com/products/audition.html, 2019, accessed Jun. 14, 2020, 7 pages.
Bromley et al., Signature Verification Using a "Siamese" Time Delay Neural Network, Proceedings of the 6th International Conference on Neural Information Processing Systems, Nov. 1993, pp. 737-744.
Clement, Yodel, Available Online at https://pypi.org/project/yodel/, Oct. 29, 2014, 4 pages.

(Continued)

*Primary Examiner* — Walter F Briney, III
(74) *Attorney, Agent, or Firm* — Kilpatrick Townsend & Stockton LLP

(57) ABSTRACT

One example method involves operations for receiving input to transform audio to a target style. Operations further include providing the audio to a predictive model trained to transform the audio into produced audio. Training the predictive model includes accessing representations of audios and unpaired audios. Further, training includes generating feature embeddings by extracting features from representations of an audio and an unpaired audio. The unpaired audio includes a reference production style, and the feature embeddings correspond to their representations. Training further includes generating a feature vector by comparing the feature embeddings using a comparison model. Further, training includes computing prediction parameters using a learned function. The prediction parameters can transform the feature vector into the reference style. Training further includes updating the predictive model with the prediction parameters. In addition, operations include generating the produced audio by modifying audio effects of the audio into the target style.

20 Claims, 10 Drawing Sheets

(56) References Cited

OTHER PUBLICATIONS

Damskagg et al., Deep Learning for Tube Amplifier Emulation, IEEE International Conference on Acoustics, Speech and Signal Processing (ICASSP 2019), May 2019, pp. 471-475.

Friedlander et al., The Modified Yule-Walker Method of Arma Spectral Estimation, IEEE Transactions on Aerospace and Electronic Systems, vol. AES-20, No. 2, Mar. 1984, 2 pages.

Germain et al., Equalization Matching of Speech Recordings in Real-World Environments, In 2016 IEEE International Conference on Acoustics, Speech and Signal Processing (ICASSP), 2016, 5 pages.

Glorot et al., Understanding the Difficulty of Training Deep Feedforward Neural Networks, Proceedings of the Thirteenth International Conference on Artificial Intelligence and Statistics, PMLR 9, Jan. 2010, pp. 249-256.

Hawley et al., SignalTrain: Profiling Audio Compressors with Deep Neural Networks, 147th Audio Engineering Society Convention, May 30, 2019, 9 pages.

Ioffe et al., Batch Normalization: Accelerating Deep Network Training by Reducing Internal Covariate Shift, in Proceedings of the 32nd International Conference on International Conference on Machine Learning, vol. 37, ICML'15, Mar. 2, 2015, pp. 1-11.

Izhaki, Mixing Audio: Concepts, Practices and Tools, Electronics & Electrical. Focal Press, 2008. 1 page.

Katz et al., Mastering Audio: The Art and the Science, Butterworth-Heinemann, Newton, MA, USA, 2003.

Kingma et al., Adam: A Method for Stochastic Optimization, In International Conference on Learning Representations, 2015, pp. 1-15.

Koch et al., Siamese Neural Networks for One-Shot Image Recognition, In Proceedings of the 32nd International Conference on International Conference on Machine Learning, 2015, 8 pages.

Levy, Complex-Curve Fitting, IRE Transactions on Automatic Control, vol. AC-4, No. 1, May 1959, 2 pages.

Linkwitz, Active Crossover Networks for Noncoincident Drivers, Journal of the Audio Engineering Society, vol. 24, No. 1, 1976, pp. 2-8.

Maas et al., Rectifier Nonlinearities Improve Neural Network Acoustic Models, In ICML Workshop on Deep Learning for Audio, Speech and Language Processing, 2013, 6 pages.

Mimilakis et al., Deep Neural Networks for Dynamic Range Compression in Mastering Applications, In Audio Engineering Society Convention 140. AES, Jun. 2016, 7 pages.

Mimilakis et al., New Sonorities for Jazz Recordings: Separation and Mixing Using Deep Neural Networks, In Proceedings of the 2nd AES Workshop on Intelligent Music Production. AES, Sep. 13, 2016, 2 pages.

Mysore, Can We Automatically Transform Speech Recorded on Common Consumer Devices in Real-World Environments into Professional Production Quality Speech? A Dataset, Insights, and Challenges, IEEE Signal Processing Letter, vol. 22, No. 8, 2014, pp. 1-5.

Parks et al., Digital Filter Design, Wiley-Interscience, 1987, 177 Pages.

Rafii et al., The MUSDB18: A Corpus for Music Separation, Available Online at https://zenodo.org/record/1117372#.Xr0GicgzY2w, Dec. 17, 2017, 5 pages.

Ramirez et al., Modeling of Nonlinear Audio Effects with End-to-End Deep Neural Networks, IEEE International Conference on Acoustics, Speech, and Signal Processing (ICASSP), 2019, 5 pages.

Ramo et al., Neural Third-Octave Graphic Equalizer, Proceedings of the 22nd International Conference on Digital Audio Effects (DAFx-19), Birmingham, UK, Sep. 2-6, 2019, pp. DAFX-1-DAFX-6.

Rimell et al., The Application of Genetic Algorithms to Digital Audio Filters, In AES Convention 98, Feb. 25-28, 1995, pp. 1-25.

Schluter et al., Zero-Mean Convolutions for Level-Invariant Singing Voice Detection, The 19th International Society for Music Information Retrieval Conference, at Paris, France, Sep. 2018, 6 pages.

Sheng et al., A Feature Learning Siamese Model for Intelligent Control of the Dynamic Range Compressor, 2019 International Joint Conference on Neural Networks (IJCNN), Jul. 2019, 8 pages.

Smith, Introduction to Digital Filters with Audio Applications, W3K Publishing, Available Online at http://www.w3k.org/books/, 2007, 1 page.

Steiglitz et al., A Technique for the Identification of Linear Systems, IEEE Transactions on Automatic Control, vol. 10, No. 4, 1965, pp. 461-464.

Sung et al., Learning to Compare: Relation Network for Few-Shot Learning, IEEE/CVF Conference on Computer Vision and Pattern Recognition, 2018, pp. 1199-1208.

Valimaki et al., Neurally Controlled Graphic Equalizer, IEEE/ACM Transactions on Audio, Speech, and Language Processing, vol. 27, No. 12, Dec. 2019, pp. 2140-2149.

Yan et al., Automatic Photo Adjustment Using Deep Neural Networks, ACM Transactions on Graphics, vol. 35, No. 2, Feb. 2016, 15 pages.

Zolzer, DAFX: Digital Audio Effects, Second Edition, John Wiley & Sons, Ltd, Hoboken, NJ, Mar. 2011. accessed Jun. 14, 2020, 14 pages.

* cited by examiner

AUDIO PRODUCTION ASSISTANT FOR STYLE TRANSFERS OF AUDIO RECORDINGS USING ONE-SHOT PARAMETRIC PREDICTIONS

TECHNICAL FIELD

This disclosure generally relates to audio enhancement and, more specifically, to automatically enhancing audio using a predictive model. The predictive model transforms audio content, having various audio quality issues, into a high-quality production style using one-shot parametric predictions.

BACKGROUND

Audio processing systems are used for providing various types of audio recordings in which end users may interact with audio content. Audio processing systems can use a number of recording devices in many different conditions to provide audio recordings. For instance, end users can use audio processing systems to improve frequently-recorded audio content (e.g., an audio recording). These audio recordings may include live events, podcasts, conferences, video blogs (vlogs), audio visual messages, music, and audiobooks, among others. In addition, many end users record such audio content using consumer devices such as smartphones, digital voice recorders (DVRs), webcams, tablets, laptops, and other personal computing devices. While consumer devices make recording audio content easier to do, the quality level of these audio recordings can be substandard or otherwise undesirable (e.g., having a less-than-desirable production quality level or style). Environmental conditions, such as low-quality microphones, background noise, reverberations from various acoustical surfaces, or lengthy physical distances between audio sources and recording devices, can negatively impact the quality level of an audio recording.

SUMMARY

Certain embodiments involve methods, systems and non-transitory computer-readable mediums having instructions stored thereon for generating produced audio content using a machine learning model. For example, certain embodiments described herein can generate produced audio content that more closely matches a production style of an audio recording using one-shot parametric predictions. One example method involves one or more processing devices performing operations that include receiving an input to transform audio content into a target production style. Operations further include providing the audio content to a machine learning model trained to transform the audio content into produced audio content. Training the machine learning model includes accessing training data that includes scaled representations of untreated audio recordings and unpaired audio recordings. Further, training the machine learning model includes generating sets of feature embeddings by extracting, in parallel, features from scaled representations of an untreated audio recording and an unpaired audio recording. The unpaired audio recording includes a reference production style. Each of the sets of feature embeddings correspond to their respective scaled representations. Training the machine learning model further includes generating, using a trained comparison model, a feature vector based on a comparison between the sets of feature embeddings. Further, training the machine learning model includes computing prediction parameters using one or more learned functions. The prediction parameters are configured to transform the feature vector into the reference production style of the unpaired audio recording. Training further includes updating the machine learning model based on the prediction parameters. In addition, operations include generating, by the machine learning model, the produced audio content by modifying one or more audio effects of the audio content. The produced audio content includes the target production style.

Other embodiments described herein can perform machine-learning for an audio production assistant for style transfers of audio recordings using one-shot parametric predictions. For instance, another example method involves one or more processing devices performing operations that includes accessing training data that includes scaled representations of untreated audio recordings and unpaired audio recordings. Further, training the machine learning model includes generating sets of feature embeddings by extracting, in parallel, features from scaled representations of an untreated audio recording and an unpaired audio recording. The unpaired audio recording includes a reference production style. Each of the sets of feature embeddings correspond to their respective scaled representations. Training the machine learning model further includes generating, using a trained comparison model, a feature vector based on a comparison between the sets of feature embeddings. Further, training the machine learning model includes computing prediction parameters using one or more learned functions. The prediction parameters are configured to transform the feature vector into the reference production style of the unpaired audio recording. Training further includes updating the machine learning model based on the prediction parameters. In addition, operations include generating, by the machine learning model, the produced audio content by modifying one or more audio effects of the audio content. The produced audio content includes the target production style.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of this disclosure are better understood when the following Detailed Description is read with reference to the drawings.

DETAILED DESCRIPTION

Figure 1:
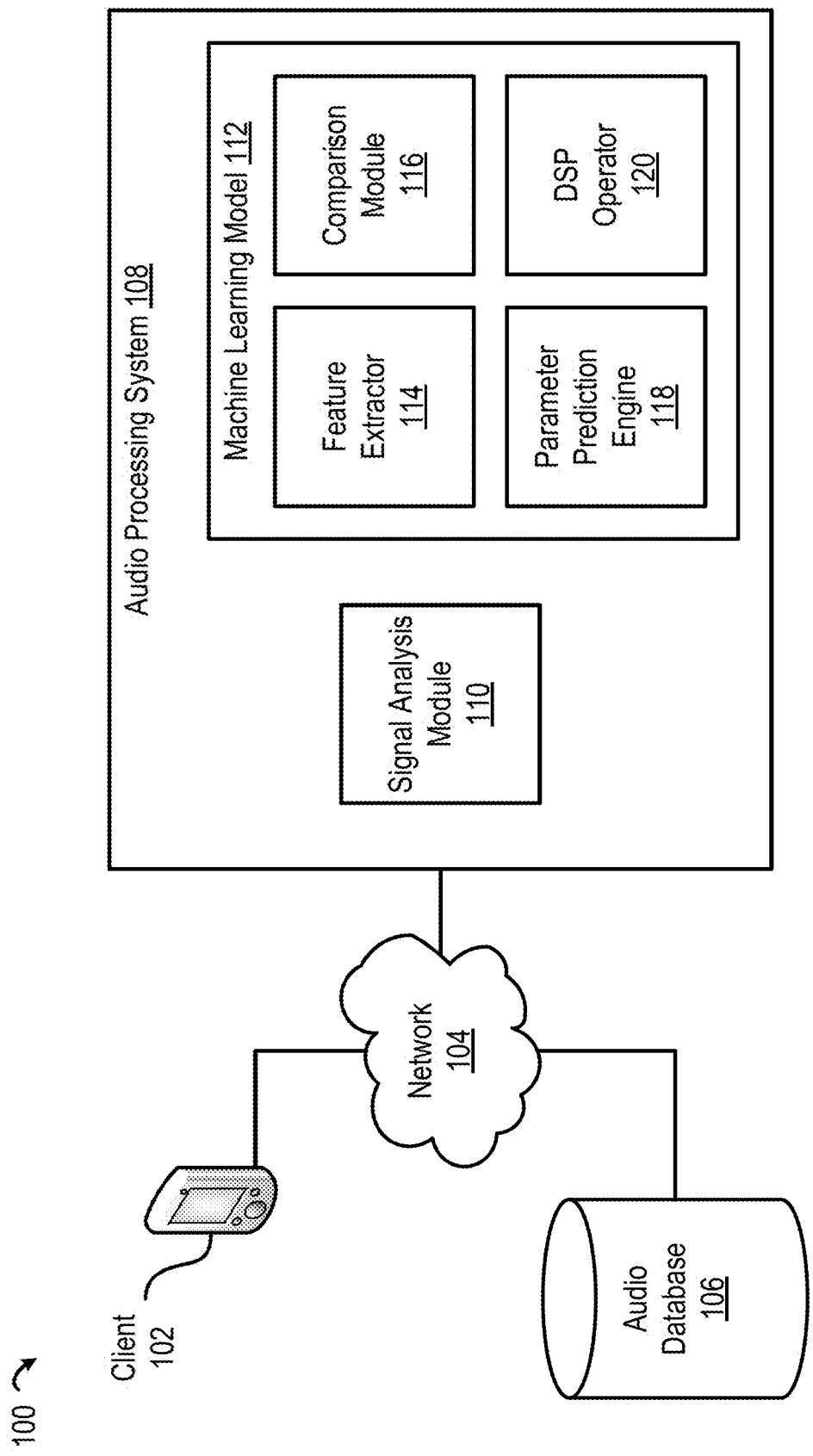
FIG. 1 depicts an example computing environment for an audio production assistant for style transfers of an audio recording using one-shot parametric predictions, according to certain embodiments of this disclosure.

Certain embodiments involve using a machine learning model to perform style transfers on untreated audio content to generate production quality audio content by applying predicted parameters of a reference production style to the untreated audio content using one-shot parametric predictions. Conventional solutions for predicting audio enhancements often convey inaccurate audio information to an audience and come with significant drawbacks. Some conventional solutions include computer-based methods tend to reduce the problem to a single quality issue, such as only noise or only reverberation. Further, some computer-based methods only focus on transforming audio recordings that are limited to either a particular duration or to a single production style. In addition, some computer-based methods require expensive, human-labeled datasets (e.g., expertly-labeled annotations) to train a model. These computer based methods can be time consuming for experienced users (e.g., audio experts, producers, engineers, etc.) and overwhelming for novice users. Audio recordings with multiple quality issues, having predetermined time durations, and limitations associated with a single production style (e.g., digital audio effects (DAFX) associated with one production style), including force-fitting models to that production style are just a few drawbacks of existing systems. That is, the inaccurate nature of some computer-based methods results in limitations in quality and type of the actual benefits provided by software tools that perform audio production transformations. Moreover, a complexity associated with training the models used by these computer-based methods to generate production style audio may limit an effectiveness of audio production transformation based on limited availability of training data or increasing processing costs.

Certain embodiments described herein address these issues by, for example, generating prediction parameters (e.g., one-shot prediction parameters) necessary to transform untreated audio content into a production style using a machine learning model trained to transform audio content using one-shot parametric predictions. The following non-limiting examples are provided to introduce certain embodiments. In one example, an audio processing system facilitates a one-shot parametric style transfer by receiving an input (e.g., a request, user input, button press, graphical user interface (GUI) selection, text input, speech-to-text input, gesture, etc.) to transform audio content (e.g., an untreated audio content). The input indicates a desired target production style. In some examples, the input may not include the target production style, and instead, the target production style may be determined based on one or more features (e.g., an ambient noise level, loudness, low-level signal properties, Mel-frequency cepstral coefficients, temporal changes, periodicity, frequency ranges, etc.) of the untreated audio content. The target production style includes a class of parameters (e.g., one or more audio effects, digital audio effects (DAFX), manipulations, audio levels, equalizations (EQs), filters, etc.). The audio processing system provides the untreated audio content to a self-supervised machine learning model trained to transform the audio content into produced audio content using a single reference audio recording as an example (e.g., using one-shot learning). The machine learning model generates the produced audio content that includes the target production style by modifying one or more audio effects that are applied to the untreated audio content. As a result, the machine learning model can enhance a wide-range of audio content, transforming the audio content into high-quality produced audio content using a number of target production styles.

In some examples, training the machine learning model involves accessing training data that includes scaled representations of untreated audio recordings and unpaired production audio recordings. Further, training the machine learning model involves generating sets of feature embeddings corresponding to scaled representations of an untreated audio recording and an unpaired production audio recording. The machine learning model generates the sets of feature embeddings in parallel by extracting features from each of the respective scaled representations. In addition, training the machine learning model includes using a trained comparison model to generate a feature vector based on a comparison between the sets of feature embeddings. In some examples, the trained comparison model concatenates the sets of feature embeddings to preserve temporal locations of audio features associated with each of the sets of feature embeddings. Further, in some examples, the trained comparison model applies a filter to project the two sets of feature embeddings into a single feature vector. Training the machine learning model further includes computing prediction parameters needed to transform the feature vector into a reference production style. The machine learning model computes prediction parameters using one or more learned functions. Additionally, training the machine learning model includes updating the machine learning model based on the prediction parameters.

As used herein, the term "audio content" refers to an audio file or recording from an audio source. The term "produced audio content" refers to audio content that achieves a desired quality audio level (e.g., a selected quality level that is based on a studio quality, audio-engineered, semantically-produced, or otherwise algorithmically-manipulated set of audio features and/or parameters) based on a target production style. Such a desired, target level of quality for the produced audio content can include a requested target production style having audio features that are defined by a class of one-hot categorical parameters.

As used herein, the term "training data" is used to refer to data or datasets that are input into the machine learning model to train the machine learning model. In one example, the training data includes untrained (e.g., untreated or raw)

audio recordings and unpaired (e.g., unrelated, distinct, or substantially different) production audio recordings.

In some examples, an untreated audio recording includes audio content that is substantially similar to a corresponding original recording (e.g., an electrical, electro-mechanical, digital, or other acoustic representation of an audio source). Further, the untreated audio recording may include an original recording that has not been improved or altered. For instance, the untreated audio recording may include a sub-standard recording quality, e.g., having undesirable artifacts, production styles, audio data, or other audio features, caused by an end-user recording device with a low-quality microphone. In other examples, incidental alterations of the untreated audio content, e.g., compression, compression artifacts, segmentation, truncation, transcoding, packet or signal loss, or other modifications, may occur during an audio transmission or manipulation of the untreated audio recording. In some examples, an unpaired production audio recording may include a minimum, high-quality level that is indicative of studio-quality audio engineering. And in some examples, the unpaired production audio recording may be associated with a particular reference style (e.g., a set of audio features defined by a class of one-hot categorical parameters).

In one example, an unpaired production audio recording may include one or more segments. In this example, the unpaired production audio recording may include a first segment that is different from a second segment. For instance, the first segment may include a speech reference production style, while the second segment may include a musical reference production style. And in some examples, each reference production style may further include different genres. For instance, the speech reference production style may further include genres associated with a type of recording, such as movie speech, podcast speech, audiobook speech, etc. Similarly, the musical reference production style may further include genres such as pop music, jazz music, hip hop music, rhythm & blues music, heavy metal music, death metal music, classic rock & roll music, etc.

Example Computing Environment for Producing Audio with an Audio Production Assistant for Style Transfers of Audio Recordings Using One-Shot Parametric Predictions Referring now to the drawings, FIG. 1 depicts an example of a computing environment 100 for producing audio using an audio production assistant for style transfers of an audio recording using one-shot parametric predictions, according to certain embodiments of this disclosure. In the example computing environment 100 depicted in FIG. 1, various client devices 102 access an audio processing system 108 via a data network 104. In some embodiments, as in the example computing environment 100 of FIG. 1, the audio processing system 108 includes a signal analysis module 110 and a machine learning model 112. In additional or alternative embodiments, the signal analysis module 110 and machine learning model 112 could be implemented in separate, independently operated computing systems.

The audio processing system 108 includes one or more devices that provide and execute one or more modules, engines, applications, etc. for providing one or more digital experiences to the user. The audio processing system 108 can be implemented using include one or more processing devices, e.g., one or more servers, one or more platforms with corresponding application programming interfaces, cloud infrastructure, and the like. In addition, each engine can also be implemented using one or more servers, one or more platforms with corresponding application programming interfaces, cloud infrastructure, and the like. The audio processing system 108 uses the one or more processing devices to execute suitable program code for performing one or more functions. Examples of this program code include software components depicted in FIG. 1, such as the machine learning model 112, feature extractor 114, audio comparison module 116, parameter prediction engine 118, and digital signal processing (DSP) operator 120.

The audio processing system 108 can use one or more of these engines to receive an input that includes audio content and a desired production style (e.g., a target production style) from a user, perform a signal analysis of the audio content to identify one or more features of the audio content, predict one or more audio effect parameters needed to transform the audio content into the desired production style, and generate produced audio content into the desired production style by modifying the one or more audio effects of the audio content using the prediction parameters. In some embodiments, the audio processing 108 automatically generates produced audio content in response to an input.

As described in detail with respect to the various examples below, the audio processing system 108 receives an input indicating a request to transform audio content. In response, the audio processing can execute the signal analysis module 110. The signal analysis module 110 identifies audio features of the audio content. The signal analysis module 110 provides the analyzed audio content (e.g., a scaled representation of the audio content) to the machine learning model 112. The machine learning model 112 is trained to generate produced audio content based on the audio features of the analyzed audio content. The machine learning model 112 can transform the analyzed audio content into a desired production style by modifying audio effects of the audio content.

In some examples, the signal analysis module 110 can select a target production style based on one or more features associated with the audio content. In some examples, the target production style may be set in advance by a user (e.g., via a graphical user interface (GUI), gesture, touch input, or other computing operation). In other examples, the user or the audio processing system 108 may include a default target production style. In additional or alternative embodiments, the audio processing system 108 may determine the target production style based on one or more features associated with the audio content (e.g., a playback duration, an amount of background or ambient noise, an amount of speech content, a presence of musical instruments, etc.). In some examples, the signal analysis module 110 provides the analyzed audio content to the machine learning model 112 with a selected target production style. Further, in some examples, the audio processing system 108 can task the machine learning model 112 with determining the target production style for transforming the audio content using the one or more features associated with the audio content. In some examples, the target production style may be randomly selected. In additional or alternative embodiments, the target production style can be randomly selected by any of the audio processing system 108, the signal analysis module 110, or the machine learning model 112.

In some embodiments, the audio processing system 108 can train the machine learning model 112. For example the computing environment 100 depicted in FIG. 1, shows the audio processing system 108 including machine learning model 112. The machine learning model 112 may be trained using one or more suitable deep learning techniques.

Examples of suitable deep learning techniques include techniques using a deep neural network (DNN) (e.g., a feed-forward neural network (FNN), a multilayer perceptron (MLP), a recurrent neural network (RNN), long-short term memory network (LSTM), independent RNN (IndRNN), etc.), a convolutional neural network (e.g., a region convolutional neural network ("R-CNN"), Fast R-CNN, or Faster R-CNN), a deep residual network (e.g., ResNet-101), etc. In some examples, the machine learning model 112 can include a Siamese DNN model (e.g., a model capable of processing information at the same time and/or in parallel). And in the example shown in FIG. 1, the machine learning model 112 includes the feature extractor 114, the comparison module 116, the parameter prediction engine 118, and the DSP operator 120.

In some embodiments, the audio processing system 108 can retrieve a corpus of training data from an audio database 106 (e.g., untreated audio recordings and unpaired production audio recordings). In one example, the audio processing system 108 can train the machine learning model 112 using the training data. The machine learning model 112 can access the corpus of training data. In some examples, the machine learning model 112 can execute the feature extractor 114 to extract features from one or more audio recordings (e.g., one or more untreated audio recordings and/or unpaired production audio recordings). And in some examples, the machine learning model 112 can execute the comparison module 116 to compare features of audio recordings (e.g., an untreated audio recording and an unpaired production audio recording). Further, the machine learning model 112 can execute the parameter prediction engine 118 to determine one or more prediction parameters needed to transform an untreated audio recording into a particular production style (e.g., a reference style predicted audio recording). In some examples, the machine learning model 112 can execute the DSP operator 120 to apply the one or more prediction parameters to the untreated audio recording to generate a reference style predicted audio recording. Further, in some examples, the reference style is the style of the unpaired production audio recording.

Some embodiments of the computing environment 100 include client devices 102. For instance, the client devices 102 may be operated by client entities (e.g., commercial entities or content providers) requesting transformation of audio recordings using techniques discussed herein. Such requests can be performed by sending audio recordings directly to the audio processing system 108. In another example, the client devices 102 may be operated by end users that desire to enhance various audio content of interest. For instance, end users may request the transformation of a podcast, vlog, social media story, etc.

Examples of a client device 102 include, but are not limited to, a personal computer, a laptop, a tablet, a desktop, a server, a mobile device, a smartphone, a processing unit, any combination of these devices, or any other suitable device having one or more processors. A user of a client device 102 uses various products, applications, or services supported by the audio processing system 108 via the data network 104.

Each of the client devices 102 are communicatively coupled to the audio processing system 108 via the data network 104. Examples of the data network 104 include, but are not limited to, internet, local area network ("LAN"), wireless area network, wired area network, wide area network, and the like.

In the example computing environment 100, the audio processing system 108 depicted in FIG. 1 executes the machine learning model 112 to generate the produced audio content. The audio processing system 108 can output the produced audio content to a requesting client 102. In one example, outputting the produced audio content may include encoding and transmitting the produced audio content to the client device 102. In some examples, the audio processing system 108 can encode the produced audio content in any suitable audio format (e.g., WAV, AIFF, MPEG-4 SLS, MPEG-4 ALS, MPEG-4 DTS, WMA, MP3, AAC, or any other suitable audio format). In other examples, outputting the produced audio content may include electronic storage on a memory associated with the computing environment 100.

Figure 2:
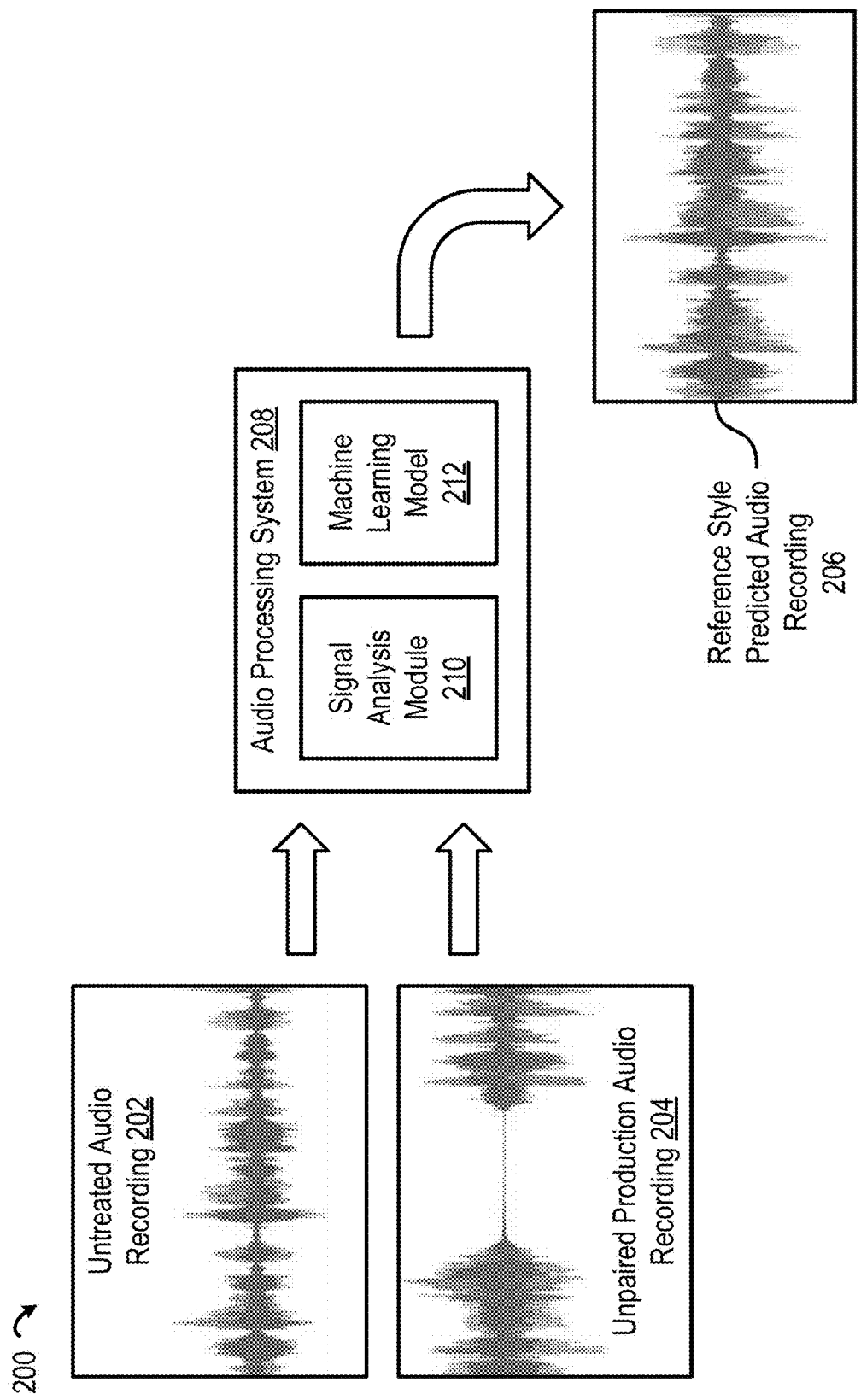
FIG. 2 depicts an example of a flow diagram for training a machine learning model for style transfers of an audio recording using one-shot parametric predictions, according to certain embodiments of this disclosure.

Examples of Training a Machine Learning Model for Style Transfers of Audio Recordings Using One-Shot Parametric Predictions The following example is provided to illustrate a potential application of the operations described above. In particular, FIG. 2 depicts a simplified example 200 of a flow diagram for training a machine learning model for a style transfer of an audio recording using one-shot parametric predictions, according to certain embodiments of this disclosure. In the example 100 shown in FIG. 1, an audio processing system 108 can obtain training data to train a machine learning model (e.g., machine learning model 112) from a remote location (e.g., audio database 106). The audio processing system 208 includes similar capabilities as described above with respect to FIG. 1. In this example, the audio processing system 208 receives training data that includes an untreated audio recording 202 and an unpaired production audio recording 204 from an audio source (not shown).

In some examples, the audio processing system 208 may randomly select the untreated audio recording and the unpaired production audio recording 204 from among the training data. And in some examples, the training data may include one or more audio datasets. For example, the training data may include a speech dataset, a device and produced speech (DAPS) dataset, an audio event dataset, an audio-visual dataset, a music dataset, another type of audio dataset, or a combination of these. In this example, the audio processing system 208 executes signal analysis module 210. The signal analysis module 210 analyzes the untreated audio recording 202 and the unpaired production audio recording 204.

In this example, the signal analysis module 210 analyzes the untreated audio recording 202 and the unpaired production audio recording 204 by generating representations for each of the untreated audio recording 202 and the unpaired production audio recording 204. For example, the signal analysis module 210 can compute time-frequency representations of the untreated audio recording 202 and the unpaired production audio recording 204. In some examples, the time-frequency representations can include a scaled representation, e.g., a waveform representation having a scaled, oscillatory amplitude over time. In one example, the waveform representation includes a Mel-spectrogram.

In one example, the signal analysis module 210 receives an audio recording (e.g., the untreated audio recording 202 or the unpaired production audio recording 204) that includes a digital representation of the signal as pulse-code modulation (PCM) data. In some examples, the audio recording may include a signal that is encoded using another technique (e.g., linear pulse-code modulation (LPCM), differential pulse-code modulation (DPCM), adaptive pulse-code modulation (ADPCM), or any other suitable quantization technique). In this example, the audio recording includes 44.1 kHz PCM data. The signal analysis module 210 computes a perceptually-motivated time-frequency representation of the audio recording.

For example, the signal analysis module 210 can compute a short-time Fourier transformation (STFT) for the audio recording. In some examples, the audio recording may include a complex audio recording that includes segments having polyphonic properties (e.g., audio data having multiple parts, voices, melodies, instruments, etc.). In one example, signal analysis module 210 computes the STFT using a hamming windowing function that includes a predetermined length and a predetermined step (e.g., hop) size. For instance, the signal analysis module 210 can perform the STFT with a hamming windowing function having a length of 1024 samples (e.g., approximately 20 ms) with a step size of 128 samples (e.g., approximately 3 ms). The signal analysis module 210 can use the resulting, complex-valued representation to compute a magnitude representation of the audio recording.

The signal analysis module 210 can use the magnitude representation to preserve frequency bands of the audio recording. In this example, the signal analysis module 210 preserves the first 513 frequency bands of the magnitude representation. The signal analysis module 210 can also use the magnitude representation to remove redundancies caused by the STFT transformation from the audio recording. Further, in this example, the signal analysis module 210 includes a Mel-based filter bank. The signal analysis module 210 uses the Mel-based filter bank to calculate Mel-frequency cepstral coefficients (MFCCs) for the resulting 513 frequency bands. The signal analysis module 210 calculates decibel (dB) values for the resulting 513 frequency bands using $20 \log_{10}(\cdot)$ to produce 128 Mel-frequency bands. In some examples, the signal analysis unit 210 may add a term (e.g., $\in =1^{-16}$) to the magnitude of the Mel-based filter-bank to reduce a number of numerically-related computational errors during the computation of the logarithm.

In some examples, the signal analysis module 210 includes a Siamese network architecture that is capable of perform signal analysis on two audio recordings (e.g., the untreated audio recording 202 and the unpaired production audio recording 204) that operates substantially simultaneously and/or in parallel. In such an example, the signal analysis module 210 can receive and perform a signal analysis on each of the audio recordings at the same time. Further, the signal analysis module 210 can provide scaled representations (e.g., time-frequency, waveform, Mel-spectrogram representations, etc.) of the audio recordings to a machine learning model 212 substantially simultaneously.

Continuing with the example 200, the audio processing system 208 executes the machine learning model 212. The machine learning model 212 includes similar capabilities as described above with respect to FIG. 1. In one example, the machine learning model 212 requests and receives the analyzed untreated audio recording 202 and the analyzed unpaired production audio recording 204 (e.g., the scaled representations) from the signal analysis module 210. In this example, the machine learning model 212 uses these scaled representations to predict parameters needed to transform the untreated audio recording 202 into a reference style predicted audio recording 206. The machine learning model 212 can generate a reference style predicted audio recording 206 using the analyzed untreated audio recording 202 and the analyzed unpaired production audio recording 204. In some examples, the machine learning model 212 can learn from the generation of the reference style predicted audio recording 206. For instance, the machine learning model 212 may update algorithms or software components (e.g., feature extractor 114, audio comparison module 116, parameter prediction engine 118, and digital signal processing (DSP) operator 120) based on information obtained from the scaled representations, predicted parameters, reference style, reference style predicted audio recording 206, or a combination of these.

Figure 3:
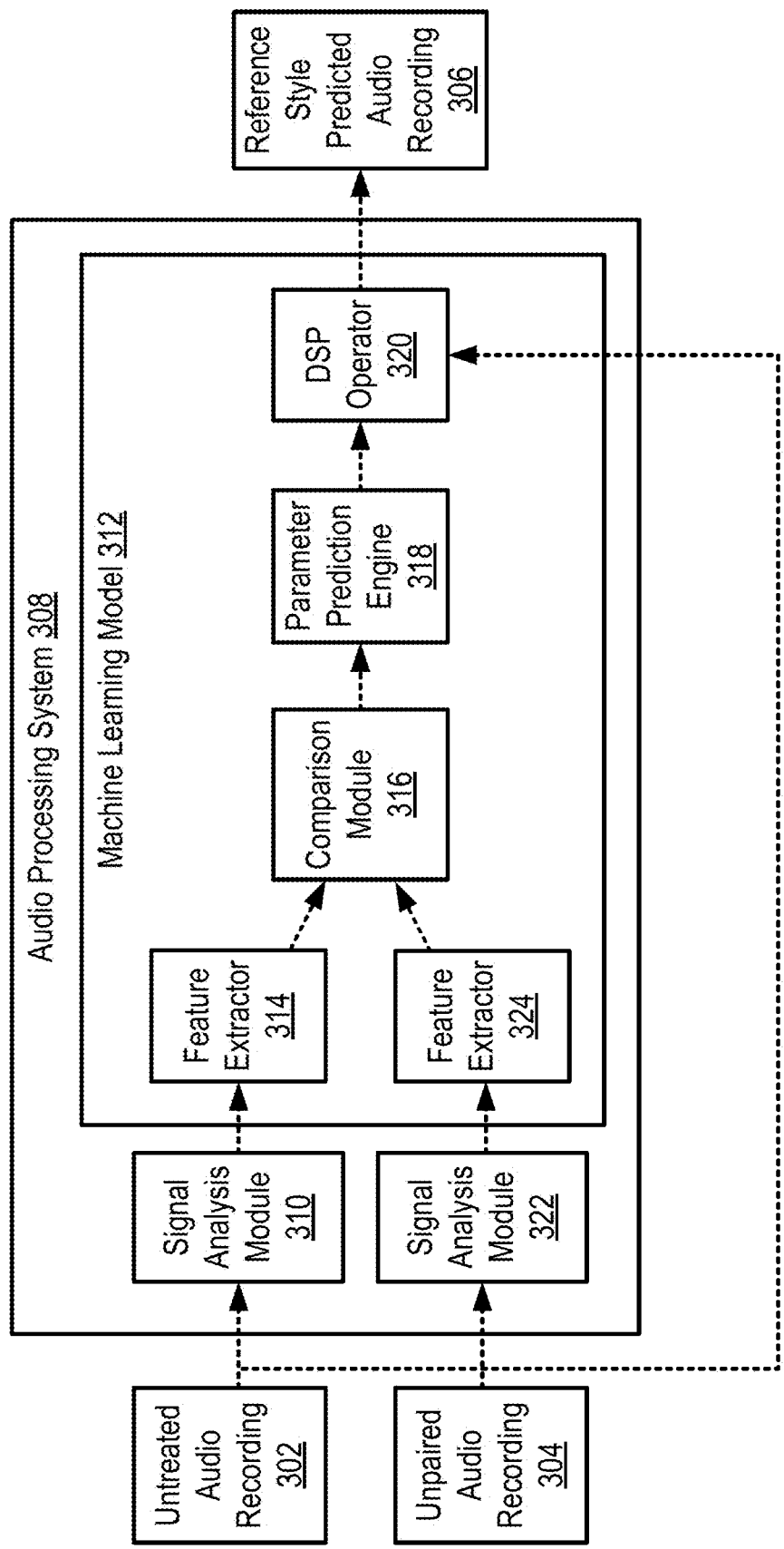
FIG. 3 depicts another example of a flow diagram for training a machine learning model for style transfers of an audio recording using one-shot parametric predictions, according to certain embodiments of this disclosure.

Turning now to FIG. 3, FIG. 3 depicts another example 300 of a flow diagram for training a machine learning model for a style transfer of an audio recording using one-shot parametric predictions, according to certain embodiments of this disclosure. In the example 300 shown in FIG. 3, an audio processing system 308 obtains training data to execute and train a machine learning model 312. In this example, the training data includes an untreated audio recording 302 and an unpaired audio recording 304. In some examples, the unpaired audio recording 304 may be a production audio recording. But in some examples, the unpaired audio recording 304 may be an untreated audio recording. For example, the untreated audio recording 302 may be a first untreated audio recording and the unpaired audio recording 304 may be a second untreated audio recording. Further, in some examples, the audio recordings 302, 304 may include a substantially similar reference style. And in some examples, the audio processing system 308 can select the audio recordings 302, 304 based on their similarities (e.g., one or more matching parameters associated with their respective reference styles).

In the example 300, the audio processing system 308 includes a Siamese network architecture that executes signal analysis modules 310, 322 in parallel. The signal analysis modules 310, 322 analyzes the untreated audio recording 302 and the unpaired audio recording 304, respectively. The signal analysis modules 310, 322 provides the analyzed signals corresponding to both the untreated audio recording 302 and the unpaired audio recording 304 to the machine learning model 312. The audio processing system 308, signal analysis modules 310, 322, and machine learning model 312 includes all of the capabilities described above.

In this example, the machine learning model 312 includes feature extractors 314, 324, comparison module 316, parameter prediction engine 318, and DSP operator 320. The machine learning model 312 receives the analyzed signals from the signal analysis modules 310, 312. The machine learning model 312 can execute feature extractors 314, 324 in parallel. The feature extractor 314 obtains the analyzed untreated audio recording 302 from the signal analysis module 310, while the feature extractor 324 obtains the analyzed untreated audio recording 302 from the signal analysis module 322 in parallel. The feature extractors 314, 324 can extract features from respective audio recordings 302, 304 substantially at the same time.

In some examples, the feature extractors 314, 324 extract features from scaled representations of their respective audio recordings. For instance, the feature extractors 314, 324 can use dB-valued, scaled representations of each of the audio recordings 302, 304 to perform operations that identify latent audio features. For instance, the feature extractors 314, 324 can use Mel-spectrograms to identify latent audio features such as an ambient noise level, loudness, amplitude, center frequency, bandwidth, temporal changes, periodicity, frequency ranges, cutoff frequencies, reverberations, feedback, etc.

In some examples, the feature extractors 314, 324 perform a series of operations that includes a two-dimensional (2D) convolution for each of the scaled representations of the audio recordings 302, 304. In some examples, the feature extractors 314, 324 can perform a batch-normalization on each resultant 2D convolutional channel corresponding to the respective dB-valued representations of the audio recordings 302, 304. Further, the feature extractors 314, 324 can identify features in each of the normalized 2D convolutional channels using a learned function. In one example, the learned function includes a leaky rectified linear unit (LReLU) activation function. In some examples, the feature extractors 314, 324 can downsample identified features of respective 2D convolutional channels by applying a max-pooling operator over time. And in some examples, the feature extractors 314, 324 can create sets of feature embeddings corresponding to each downsampled 2D convolutional channels by calculating global averages of the features resulting from the max-pooling-over-time.

In some examples, the feature extractors 314, 324 can use more than one learned functions to identify features in the 2D channels. For example, the feature extractors 314, 324 can employ a linear, non-linear, sigmoid or logistic, hyperbolic tangent, rectified linear unit (ReLU), LReLU, or any other suitable learned or activation function. And in some examples, the feature extractors 314, 324 can downsample the 2D channels using another deep-learning technique. For instance, the feature extractors 314, 324 can use another suitable pooling technique, e.g., average pooling, max pooling, average pooling over time, global average pooling, global max pooling, etc. Further, in some examples, the feature extractors 314, 324 can transmit the generated sets of feature embeddings to the comparison module 316. In some examples, the Siamese network architecture of feature extractors 314, 324 can use few-shot learning (e.g., training using between zero and five examples) or one-shot learning (e.g., training using one example).

In one example, the untreated audio recording 302 includes a number of i features and can be represented by an input $X^{(i)}$. In this example, the unpaired audio recording 304 can be represented by an input $Y^{(i)}$. In addition, a number of features embeddings for each input can be represented by $\xi$. In one example, the sets of feature embeddings can be represented by the following expressions.

$$\xi_X^{(i)} \in \mathbb{R}^F, \xi_Y^{(i)} \in \mathbb{R}^F$$

Here, the term $\xi_X^{(i)}$ represents the set of feature embeddings corresponding to the $X^{(i)}$ input, the term $\mathbb{R}$ represents resulting parameters, and F represents individual features of the set of feature embeddings. Likewise, the term $\xi_Y^{(i)}$ represents the set of feature embeddings corresponding to the $Y^{(i)}$ input.

In the example 300, the machine learning model 312 can execute comparison module 316. The comparison module 316 is trained to compare features of the two sets of feature embeddings and filter out relevant shared features. The comparison module 316 create a single feature vector using the sets of feature embeddings from the feature extractors 314, 324. In one example, the comparison module 316 concatenates the sets of feature embeddings to form a feature space. In some examples, the comparison module 316 can reduce a dimensionality of the feature space using a one-dimensional convolution.

In some examples, the comparison module 316 creates the feature space by generating a matrix of the 2D convolutional channels above. For instance, the comparison module 316 can creates the feature space by that is a two-channel matrix.

In one example, the comparison module 316 can calculate the two-channel matrix using the following expression.

$$Z \in \mathbb{R}^{2 \times F}$$

Here, the term Z represents the two-channel matrix, the term $\mathbb{R}$ represents resulting parameters, and F represents the features of the sets of feature embeddings. Each channel of the two-channel matrix Z has a size of F number of the features. In some examples, the comparison module 316 can perform a one-dimensional convolution of the two-channel matrix Z using a trained comparison model that is trained to filter features.

For instance, the trained comparison model can project down the number of channels down to one. In some examples, the trained comparison model can use a predetermined number of elements for a comparison of the features present in each channel of the two-channel matrix Z. Further, in some examples, the one-dimensional convolution includes contextual information related to the sets of feature embeddings. For example, the contextual information may include a number of neighboring features that are applied to a comparison of a single element in the feature space.

In some examples, the trained comparison model can act as a one-dimensional filter. For example, the one-dimensional trained comparison model can include a filter having a predetermined length B. In some examples, the predetermined length B represents a predetermined number of elements (e.g., features). Further, the trained comparison model can compare B number of elements based on a frequency dimension of extracted sets of feature embeddings (e.g., the sets of feature embeddings received from the feature extractors 314, 324). In one example, the filter compares 129 B elements based on a number of the features extracted by the feature extractors 314, 324 (e.g., using the 128 Mel-frequency bands, which were previously adjusted upwardly by 1).

In some examples, the comparison module 316 can apply constraints to the trained comparison model to ensure a resulting feature vector of the one-dimensional convolution does not change in dimensionality. For example, the comparison module 316 can use zero-padding for inputs that include the two-channel matrix using the following expression.

$$P = \frac{B-1}{2}$$

Here, the term P represents the zero-padding and the term B represents the number of elements discussed above. In some examples, the comparison module 316 can transmit the one-dimensional resultant feature vector to the parameter prediction engine 318.

In some examples, the comparison module 316 can execute the trained comparison model on the resulting feature vector using an estimator. Since the machine learning model 312 uses a directed hierarchical model, the trained comparison model can use a single target variable and a single optimization objective to determine a single latent variable that conditions the resulting feature vector. For instance, an input of the resulting feature vector can be optimized before being sent to the parameter prediction engine 318.

In one example, latent variables (e.g., parameters) can be used in an ideal scenario to ensure an accurate parameter prediction. In this example, the machine learning model 312 can use extracted features with an assumption that they represent unbiased estimators of ideal sets of features. Further, since the latent variables depend on both input signals (e.g., the two-channel matrix derived from the audio recordings discussed above), an estimator can be used to accurately select elements for the feature vector using the following expression.

$$\mathbb{E}[\mathcal{H}(X^{(i)}) - \xi^{(i)}] + \mathbb{E}[\mathcal{H}(Y^{(i)}) - \xi^{(i)}] = 0$$

Given the assumptions above, the expression above can be rewritten as follows.

$$\mathbb{E}[\mathcal{H}(X^{(i)}) - \mathcal{H}(Y^{(i)})] = 0$$

Here, $\xi$ represents a latent variable (e.g., parameters included in the feature vector), the extracted features are represented by $\mathcal{H}$, input signals $X^{(i)}$ and $Y^{(i)}$ represent scaled representations of the audio recordings, and $\mathbb{E}$ represents an estimator for selecting elements.

In some examples, e.g., an unbiased case, the estimator $\mathbb{E}$ can be based on an assumption that extracted features $\mathcal{H}$ includes substantially identical latent information (e.g., features) between the analyzed untreated audio recording 302 and the analyzed unpaired audio recording 304. In other examples, e.g., a biased case, the estimator $\mathbb{E}$ may include differences based on an imbalance of extracted features from $\mathcal{H}(X^{(i)})$ and from $\mathcal{H}(Y^{(i)})$. In some examples, these differences can be reduced by performing an optimization function. In other examples, some biased estimators may can be substantially minimal and cause little-to-no differences between $\mathcal{H}(X^{(i)})$ and $\mathcal{H}(Y^{(i)})$.

Advantageously, the Siamese network architecture of the feature extractors 314, 324 may improve an overall quality level of the feature vector generated by the comparison module 316. Additionally, since the feature vector can be provided by the comparison module 316 as inputs for the prediction parameter engine 318, the overall quality level of prediction parameters $\mathcal{P}$ may be improved. For instance, by avoiding alternate comparison models (e.g., an element-wise subtraction-based comparison model), the trained comparison model described above may avoid a need for additional training stages. Further, the trained comparison model may also improve the overall quality level of the inputs for the prediction parameter engine 318 by using unpaired data (e.g., the analyzed unpaired audio recording 304). In doing so, prediction parameters $\mathcal{P}$ output by the prediction parameter engine 318 can avoid being conditioned on degenerate latent information that can occur as a result of using a subtraction-based comparison.

Continuing with the example 300, the machine learning model 312 can execute parameter prediction engine 318. The parameter prediction engine 318 can include one or more deep learning techniques, e.g., DNNs that are trained to use information obtained from a feature vector to predict parameters that are necessary to transform the untreated audio recording 302 from one style into another (e.g., the reference style predicted audio recording 306). In one example, parameter prediction engine 318 can generate the prediction parameters $\mathcal{P}$ that are dependent on the features obtained from the comparison module 316 (e.g., the feature vector). For example, the generation of the prediction parameters $\mathcal{P}$ can be expressed by a function $\mathcal{P}(\xi)$. In this example, $\mathcal{P}$ represents the prediction parameters and $\xi$ represents the features (e.g., the feature vector). In some examples, the parameter prediction engine 318 includes two FNNs and a one-hot categorical transcoder.

In one example, the parameter prediction engine 318 obtains information from the feature vector discussed above and generates a parameter space by feeding the information to two fully-connected FNNs. In some examples, one or more learned functions may be applied to the resulting output from the two FNNs. In some examples, the information output by the two FNNs in the parameter space may be encoded and decoded using the one-hot categorical transcoder. In some examples, it may be advantageous to perform one-hot transcoding to reduce a number of computations. For example, one-hot categorical transcoding can be performed on the prediction parameters $\mathcal{P}$ of the parameter space by generating corresponding numerical DAFX values. These DAFX values can reduce a number of computations required to determine an ideal cost function (e.g., a quantified error rate between predicted values and expected values) for each of the prediction parameters $\mathcal{P}$.

In some examples, the parameter prediction engine 318 uses one or more learned functions to determine prediction parameters. And in some examples, the parameter prediction engine 318 can apply the one or more learned functions to the output of the fully-connected FNNs. Further, the one or more learned functions can include one or more activation functions. In addition, the one or more activation functions may be non-linear activation functions (e.g., a sigmoid, hyperbolic tangent, ReLU, LReLU function, softmax function, or a combination of these). In some examples, the parameter prediction engine 318 can apply two or more activation functions to the output of the FNNs. In one example, the parameter prediction engine 318 may apply a first activation function, e.g., a LReLU activation function, to the output of the first FNN. In this example, the second FNN convolves the results of the LReLU activation function and the parameter engine 318 performs a second non-linear activation function, e.g., a softmax activation function on the output of the second FNN. In some examples, the parameter prediction engine 318 performs a one-hot categorical decoding function on the resulting information to obtain numerical values (e.g., DAFX values) for the prediction parameters in the parameter space. In some examples, the parameter prediction engine 318 can provide numerical DAFX values to the DSP operator 320.

The machine learning model 312 can execute DSP operator 320. DSP operator 320 can obtain numerical DAFX values from the parameter prediction engine 318. The DSP operator 320 is capable of using the DAFX values to transform a style of the untreated audio recording 302 into another style. In this example, the DSP operator 320 modifies the untreated audio recording 302 to generate the reference style predicted audio recording 306. In some examples, the DSP operator 320 alters one or more parameters of the untreated audio recording 302 based on the DAFX values using the prediction parameters of the parameter space. For instance, the DSP operator 320 can use the DAFX values to change audio parameters such as a loudness, noise reduction, rumble reduction, saturation, distortion, distortion plugin, 3-band distortion, high-pass filter (HPF), low-pass filter (LPF), de-Essing filter, de-Hum filter, reverberation reduction, dynamic range compressing, vocal enhancement, one or more EQ bands (e.g., a 4-band EQ), etc. In some examples, the DSP operator 320 can generate the reference style predicted audio recording 306 in a production style associated with the unpaired audio recording 304 (e.g., the reference style is substantially the same production style as the production style of the unpaired audio recording 304).

Figure 4:
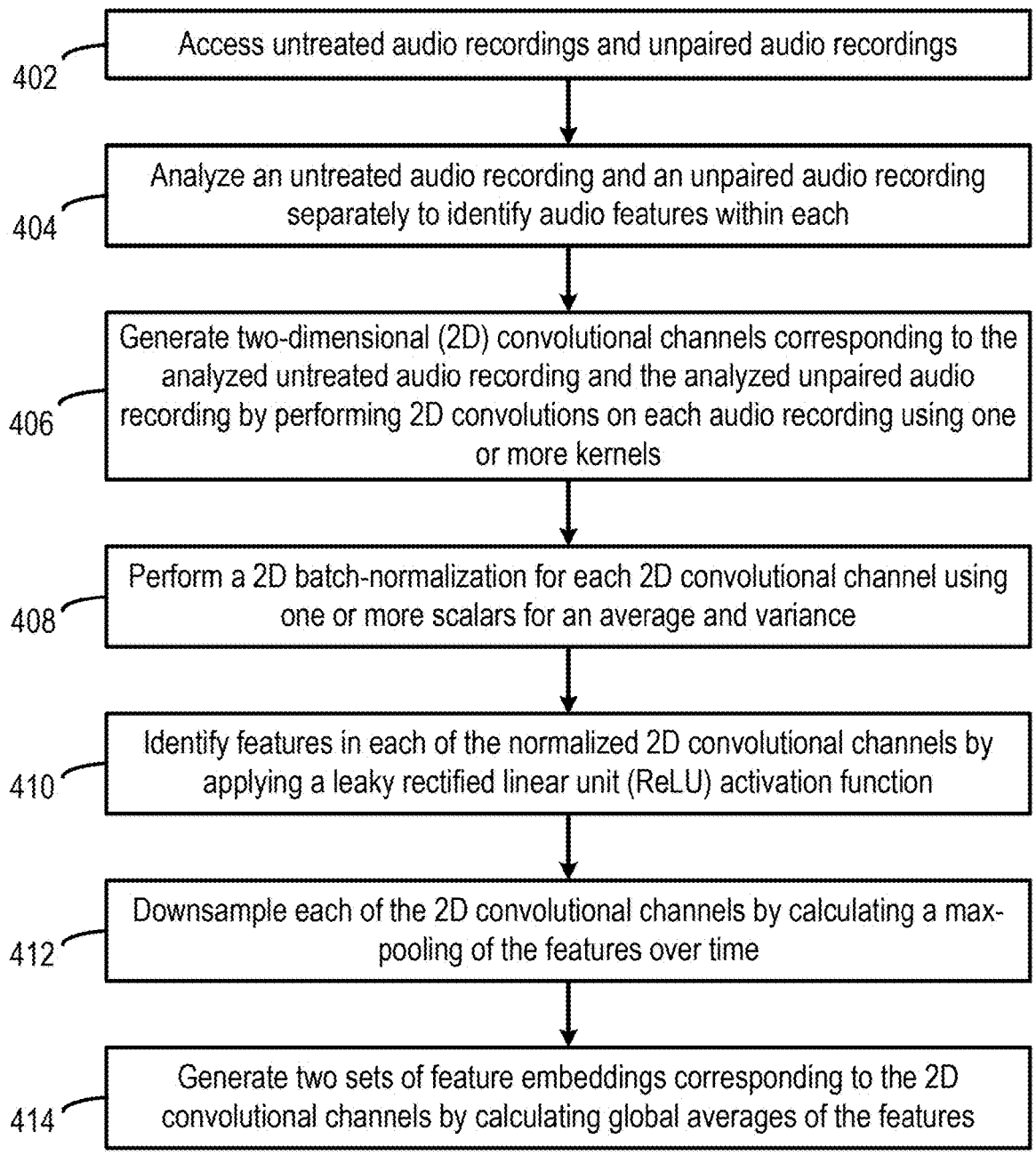
FIG. 4 depicts an example of a process for training a machine learning model for style transfers of an audio recording using one-shot parametric predictions, according to certain embodiments of this disclosure.

Examples of Processes for Training a Machine Learning Model for Producing Audio with a Style Transfer of Audio Recordings Using One-Shot Parametric Predictions FIG. 4 is an example of a process 400 for training a machine learning model for a style transfer of an audio recording using one-shot parametric predictions, according to certain embodiments of this disclosure. One or more operations described with respect to FIG. 4 can be used to implement steps for training a machine learning model (e.g., one or more of machine learning models 112, 212, 312) to produce audio content according certain embodiments discussed herein. One or more processing devices (e.g., computing environment 100) implement operations depicted in FIG. 4 by executing suitable program code (e.g., machine learning model 112). For illustrative purposes, the process 400 is described with reference to certain examples depicted in the figures. Other implementations, however, are possible.

At block 402, the process 400 involves accessing untreated audio recordings and unpaired audio recordings. For example, an audio processing system 108 accesses a database of audio content (e.g., audio database 106) to retrieve training data. In some examples, the audio processing system 108 can access audio database 106 to obtain training audio content (e.g., untreated audio recordings and/or unpaired audio recordings), audio data, audio information, other training data, or a combination of these. In one example, the audio processing system 108 obtains a corpus of training data from the audio database 106.

In some examples, the training data includes a combination of shared data from the audio database 106. In this example, the training data includes a set of untreated audio recordings. Further, in this example, the training data includes a set of unpaired audio recordings. In some examples, the training data includes audio data. For instance, the training data may include audio metadata (e.g., a length, title, author, genre, classification, segment number, ID3 tag, geolocation tag, recording location tag, etc.). In some examples, the audio processing system 108 provides the training data to the signal analysis module 110. In additional or alternative embodiments, the training data may include annotations indicating signal analysis was previously performed on the untreated audio recordings and unpaired audio recordings. In such a case, the audio processing system 108 may provide the training data to the machine learning model 112.

At block 404, the process 400 involves analyzing an untreated audio recording and an unpaired audio recording separately to identify audio features within each. In some examples, the audio processing system 108 can select the untreated audio recording and the unpaired audio recording from among the training data. In other examples, the audio processing system 108 can execute the machine learning model 112, and the machine learning model 112 can select the untreated audio recording and the unpaired audio recording. Further, in some examples, each of the untreated audio recording and the unpaired audio recording can be randomly-selected by either the audio processing system 108 or the machine learning model 112.

As described above, the unpaired audio recording can be a production audio recording or an untreated audio recording. Further, both of the untreated audio recording and the unpaired audio recording may be untreated and include a substantially similar or the same reference style. In one example, the audio processing system 108 can select the untreated audio recording and the unpaired audio recording based on one or more shared parameters associated with their respective reference styles. In this example, the audio processing system 108 can execute the signal analysis module 110 to identify audio features of each of the audio recordings according to any of the techniques discussed herein. The signal analysis module 110 can generate and transmit scaled representations of the audio recordings to the machine learning model 112.

In one example, the signal analysis module 110 analyzes the untreated audio recording and the unpaired audio recording by generating scaled representations of each respective recording. In some examples, the signal analysis module 110 computes scaled representations, e.g., Mel-spectrograms, for each respective recording to obtain a perceptually-motivated time-frequency representation of the audio recording. In some examples, the signal analysis module 110 can include a Siamese network architecture that is capable of operating in parallel. In some examples, the signal analysis module 110 provides the scaled representations to the machine learning model 112.

At block 406, the process 400 involves generating two-dimensional (2D) convolutional channels corresponding to the analyzed untreated audio recording and the analyzed unpaired audio recording by performing 2D convolutions on each audio recording using one or more kernels. The machine learning model 112 receives training data from an audio source. In this example, the machine learning model 112 receives analyzed audio recordings (e.g., corresponding to the untreated audio recording and the unpaired audio recording) from the signal analysis module 110. In some examples, the machine learning model 112 can receive the analyzed audio recordings from the audio processing system 108, the audio database 106, or another audio source.

The machine learning model 112 can perform self-supervised learning. For example, the machine learning model 112 can execute a feature extractor 114. The feature extractor 114 can extract features from the analyzed signals that represent the audio recordings. In some examples, the feature extractor 114 can identify one or more latent audio features of the analyzed signals according to any of the techniques discussed herein. In some examples, the feature extractor 114 can include a Siamese network architecture that is capable of operating in parallel. In one example, the feature extractor 114 performs operations on the analyzed signals that include a 2D convolution. For example, the feature extractor 114 can include a 2D convolutional operator capable of using one or more convolutional kernels to generate 2D convolutional channels corresponding to the analyzed untreated audio recording and the analyzed unpaired audio recording.

In some examples, the feature extractor 114 performs self-supervised learning using a multiple kernel learning algorithm. For example, the feature extractor 114 can use a combination of convolutional kernels as parameters (e.g., rules) that allow the machine learning model 112 to operate under self-supervision. In one example, the feature extractor 114 can perform the 2D convolution using a predetermined number of kernels (e.g., 10) to provide fixed parameters for the self-supervised learning. In this example, the feature extractor 114 performs the 2D convolution using a 2D convolutional operator capable of convolving 10 kernels. Each of the 10 kernels can include a predetermined size. And in this example, the size of the convolutional kernels are (3, 3). The feature extractor 114 performs the 2D convolution and outputs 2D convolutional channels using the 3×3×10 operation to generate first convolutional layers corresponding to each of the analyzed untreated audio recording and the analyzed unpaired audio recording.

At block 408, the process 400 involves performing a 2D batch-normalization for each 2D convolutional channel using one or more scalars for an average and a variance. In this example, the feature extractor 114 can perform a 2D batch-normalization of the 2D convolutional channels from block 406 to scale their respective features. In some examples, the feature extractor 114 can use an alternative normalization technique that is different from a batch-normalization (e.g., min-max normalization, mean normalization, Z-score normalization, unit vector normalization, etc.). In additional or alternative embodiments, the feature extractor 114 can perform a standardization of the 2D convolutional channels (e.g., rescaling associated with features using a mean value of 0 with a standard deviation 6 of 1 for unit variance).

In one example, the feature extractor 114 performs the normalization for each of the 2D convolutional channels using one or more scalars. For example, the feature extractor 114 can perform the normalization using a first scalar for an average and a second scalar for a variance. In some examples, the second scalar is different from the first scalar. In other examples, the feature extractor 114 can use the same scalar for the average and the variance (e.g., the first scalar having the same value as the second scalar).

In some examples, the feature extractor 114 can perform the batch normalization using a predetermined number of kernels as parameters for self-supervised learning. Additionally, the predetermined number of kernels used for batch normalization may be different from a number of kernels used for the 2D convolution. For example, the first convolutional layers discussed above, corresponding to the 2D convolutional channels, used 10 kernels. And in this example, second convolutional layers, corresponding to respective 2D convolutional channels, are created by performing the batch normalization discussed above using 15 kernels. In this example each of the 15 kernels has a size of (3, 3). The feature extractor 114 generates the second convolutional layers using the 2D convolutional operator to output features corresponding to each 2D convolutional channel based on a second convolutional operation (e.g., a 3×3×15 convolution).

At block 410, the process 400 involves identifying features in each of the normalized 2D convolutional channels by applying a leaky rectified linear unit (LReLU) activation function. In this example, the feature extractor 114 performs operations that include identifying features of the normalized 2D convolutional channels from block 408. The feature extractor 114 can perform a 2D convolution on the second convolutional layer by applying an activation function to each of the normalized 2D convolutional channels. In some examples, the feature extractor 114 can use any learned function (e.g., activation function) described herein. In one example, the feature extractor 114 identifies features in the normalized 2D convolutional channels using the LReLU function. In one example, third convolutional layers, for the respective 2D convolutional channels discussed above, are generated using 15 kernels. In this example, the feature extractor 114 uses the second convolutional layers to generate the third convolutional layers. The third convolutional layers include features corresponding to each normalized 2D convolutional channel by performing another 3×3×15 convolution.

At block 412, the process 400 involves downsampling each of the 2D convolutional channels by calculating a max-pooling of the features over time. In this example, the feature extractor 114 performs operations that include downsampling the 2D convolutional channels from block 410. The feature extractor 114 can perform a 2D convolution on the third convolutional layer by calculating a max-pooling-over-time for the features identified in block 410. For instance, the feature extractor 114 can generate fourth convolutional layers corresponding to each of the 2D convolutional channels using 20 kernels. In this example, the resultant fourth convolutional layers can include max-pooled features that correspond to each of the 2D convolutional channels. Further, the feature extractor 114 can use a max-pooling operator to performing the 3×3×20 convolutions. In one example, the max-pooling operator performs the max-pooling-over-time operations for each 2D convolutional channel for a predetermined number of time frames.

At block 414, the process 400 involves generating two sets of feature embeddings corresponding to the 2D convolutional channels by calculating global average of the features. In this example, the feature extractor 114 performs operations that include sets of feature embeddings for the 2D convolutional channels obtained from block 412. The feature extractor 114 can perform a 2D convolution on the fourth convolutional layer by calculating a global average for the time frames of the max-pooled 2D convolutional channels from block 412. For instance, the feature extractor 114 can generate fifth convolutional layers for each of the 2D convolutional channels. In one example, the feature extractor 114 uses 20 kernels to generate the fifth convolutional layers based on a global average of the time frames from block 412. The feature extractor 114 can perform 3×3×20 convolutions on the downsampled time frames.

In this example, the resultant fifth convolutional layers represent sets of feature embeddings (e.g., feature vectors) that are derived from the global averaging of features from the downsampled 2D convolutional channels. In some examples, the global averaging of features can provide weight sharing that can reduce an overall memory footprint required to convolve the downsampled 2D convolutional channels across the downsampled time frames. Further, the weight sharing achieved by the global averaging can reduce an overall number of learned parameters, which can allow for more efficient, faster learning by the machine learning model 112.

Figure 5:
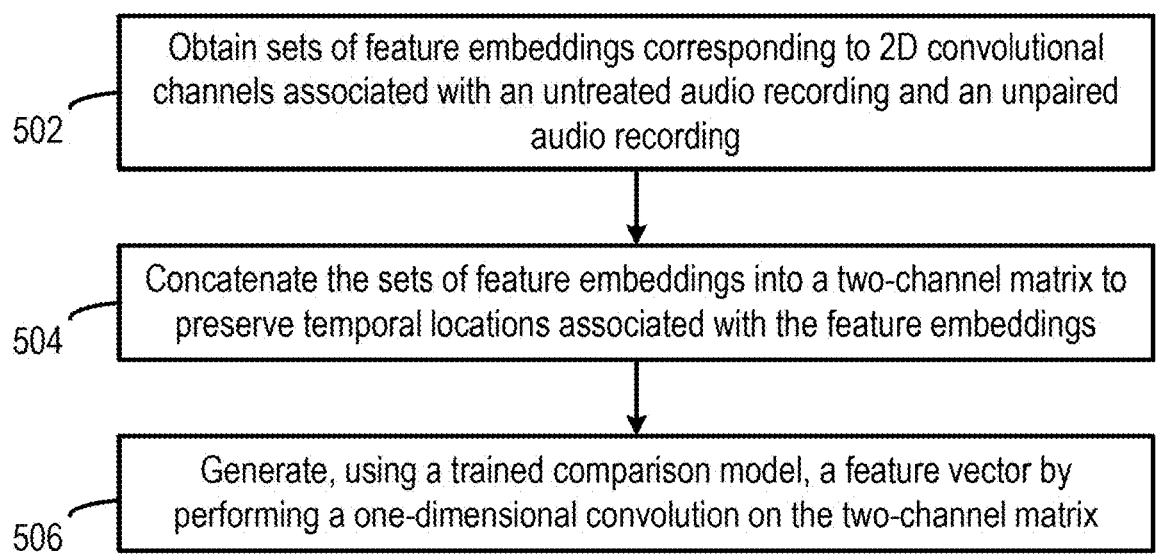
FIG. 5 depicts another example of a process for training a machine learning model for style transfers of an audio recording using one-shot parametric predictions, according to certain embodiments of this disclosure.

FIG. 5 is another example of a process 500 for training a machine learning model for a style transfer of an audio recording using one-shot parametric predictions, according to certain embodiments of this disclosure. One or more operations described with respect to FIG. 5 can be used to implement steps for training a machine learning model (e.g., machine learning models 112, 212, 312) to produce audio content according certain embodiments discussed herein. One or more processing devices (e.g., computing environment 100) implement operations depicted in FIG. 5 by executing suitable program code (e.g., machine learning model 112). For illustrative purposes, the process 500 is described with reference to certain examples depicted in the figures. Other implementations, however, are possible.

At block 502, the process 500 involves obtaining sets of feature embeddings corresponding to 2D convolutional channels associated with an untreated audio recording and an unpaired audio recording. For example, an audio processing system 108 can execute a comparison module 116. The comparison module 116 can receive the sets of feature embeddings corresponding to 2D convolutional channels associated with the untreated audio recording and the unpaired audio recording from an audio source (e.g., the audio processing system 108, machine learning model 112, or feature extractor 114). As described above, the unpaired audio recording can be a production audio recording or another untreated audio recording. In one example, the comparison module 116 obtains the sets of feature embeddings that are generated according to any of the techniques described above in process 400 of FIG. 4.

At block 504, the process 500 involves concatenating the sets of feature embeddings into a two-channel matrix to preserve temporal locations associated with the feature embeddings. The comparison module 116 can concatenate the generated sets of feature embeddings by creating a two-channel matrix Z in a substantially similar manner as described above with respect to FIG. 3. In this example, the comparison module 116 concatenates the sets of feature embeddings into the two-channel matrix Z that includes resulting parameters $\mathbb{R}$ having F features associated with the sets of feature embeddings.

At block 506, the process 500 involves generating, using a trained comparison model, a feature vector by performing a one-dimensional convolution on the two-channel matrix. In this example, the comparison module 116 can perform a one-dimensional convolution to project down the number of channels down to one (e.g., a single feature vector). In some examples, the comparison module 116 can generate the single feature vector by comparing a number of elements shared by the sets of feature embeddings. For instance, the comparison module 116 can include a trained comparison model capable of acting as a filter according to any of the techniques described herein. In some examples, the comparison module 116 can generate a feature vector based on a one-dimensional convolution of the sets of feature embeddings (e.g., the two-channel matrix Z). Further, the comparison module 116 can transmit the feature vector to a parameter prediction engine 118.

Figure 6:
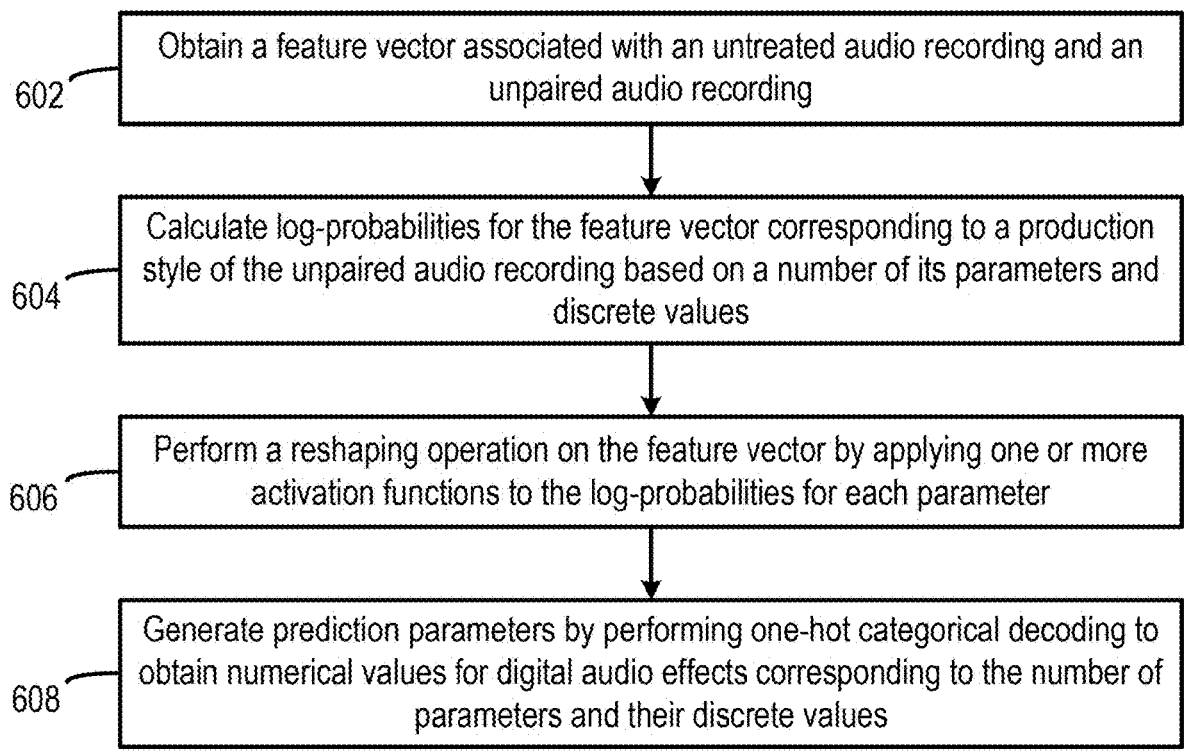
FIG. 6 depicts another example of a process for training a machine learning model for style transfers of an audio recording using one-shot parametric predictions, according to certain embodiments of this disclosure.

FIG. 6 is another example of a process 600 for training a machine learning model for a style transfer of an audio recording using one-shot parametric predictions, according to certain embodiments of this disclosure. One or more operations described with respect to FIG. 6 can be used to implement steps for training a machine learning model (e.g., machine learning models 112, 212, 312) to produce audio content according certain embodiments discussed herein. One or more processing devices (e.g., computing environment 100) implement operations depicted in FIG. 6 by executing suitable program code (e.g., machine learning model 112). For illustrative purposes, the process 600 is described with reference to certain examples depicted in the figures. Other implementations, however, are possible. In one example, the parameter prediction engine 118 includes two FNNs and a one-hot categorical transcoder. In some examples, the parameter prediction engine 118 can encodes parameters using DAFX values. In this example, the parameter prediction engine 118 create a parameter space by feeding information (e.g., the encoded parameters) to two fully-connected FNNs.

At block 602, the process 600 involves obtaining a feature vector associated with an untreated audio recording and an unpaired audio recording. In one example, the machine learning model 112 executes the parameter prediction engine 118. The parameter prediction engine 118 can receive the feature vector from an audio source (e.g., the audio processing system 108, machine learning model 112 or comparison module 116). In some examples, the feature vector may be generated using one or more of the techniques described above with respect to the process 500 of FIG. 5. In this example, the parameter prediction engine 118 receives the feature vector that is the result of a one-dimensional convolution of two sets of feature embeddings (e.g., a two-channel matrix Z) corresponding to the untreated audio recording and the unpaired audio recording.

At block 604, the process 600 involves calculating log-probabilities for the feature vector corresponding to the production style of the unpaired audio recording based on a number of its parameters and discrete values. In one example, the parameter prediction engine 118 provides a predetermined number of inputs to a first FNN. In some examples, the input nodes may be based on parameters from the feature vector above. For instance, the parameter prediction engine 118 can feed input nodes to the first FNN that uses a predetermined sample rate and a predetermined frequency. In one example, the input nodes are derived from the predetermined sample rate and the predetermined frequency and includes two inputs of 2560 and 440 nodes, respectively.

In some examples, one or more activation functions may be applied to the resulting outputs from the two FNNs. In one example, the parameter prediction engine 118 applies a LReLU activation function to the output of the first FNN. In this example, the parameter prediction engine 118 provides the resulting information to a second FNN. The second FNN produces a number of output nodes based on a number of parameters multiplied by a number discrete values (e.g., quantized parameter values) provided by the parameter prediction engine 118. In some examples, a second activation function can be performed by the parameter prediction engine 118.

For example, at block 606, the process 600 involves performing a reshaping operation on the feature vector by applying one or more activation functions to the log-probabilities for each parameter. In one example, the parameter prediction engine 118 can apply an activation function to the feature vector obtained from the second FNN in block 604. In this example, the parameter prediction engine 118 applies a softmax activation function to the log-probabilities for each parameter that is output by the second FNN. The softmax activation function rearranges the feature vector in the form of a matrix. The matrix can include a dimensionality associated with the number of parameters multiplied by the number of quantized parameter values. In some examples, the softmax activation function may be computed using the same number of discrete steps performed for each parameter.

At block 608, the process 600 involves generating prediction parameters by performing one-hot categorical decoding to obtain numerical values for digital audio effects corresponding to the number of parameters and their discrete values. In one example, the parameter prediction engine 118 performs a one-hot categorical decoding function on the resulting information (e.g., the reshaped feature vector) obtained from block 606. In this example, the parameter prediction engine 118 can calculate DAFX values for each of the prediction parameters in the parameter space using the one-hot categorical decoding function. In some examples, performing one-hot categorical transcoding may be advantageous to reduce a number of computational cycles. For instance, one-hot categorical transcoding can reduce computations for determining an ideal cost function. In some examples, the parameter prediction engine 118 can provide these numerical DAFX values to a DSP operator 120.

Figure 7:
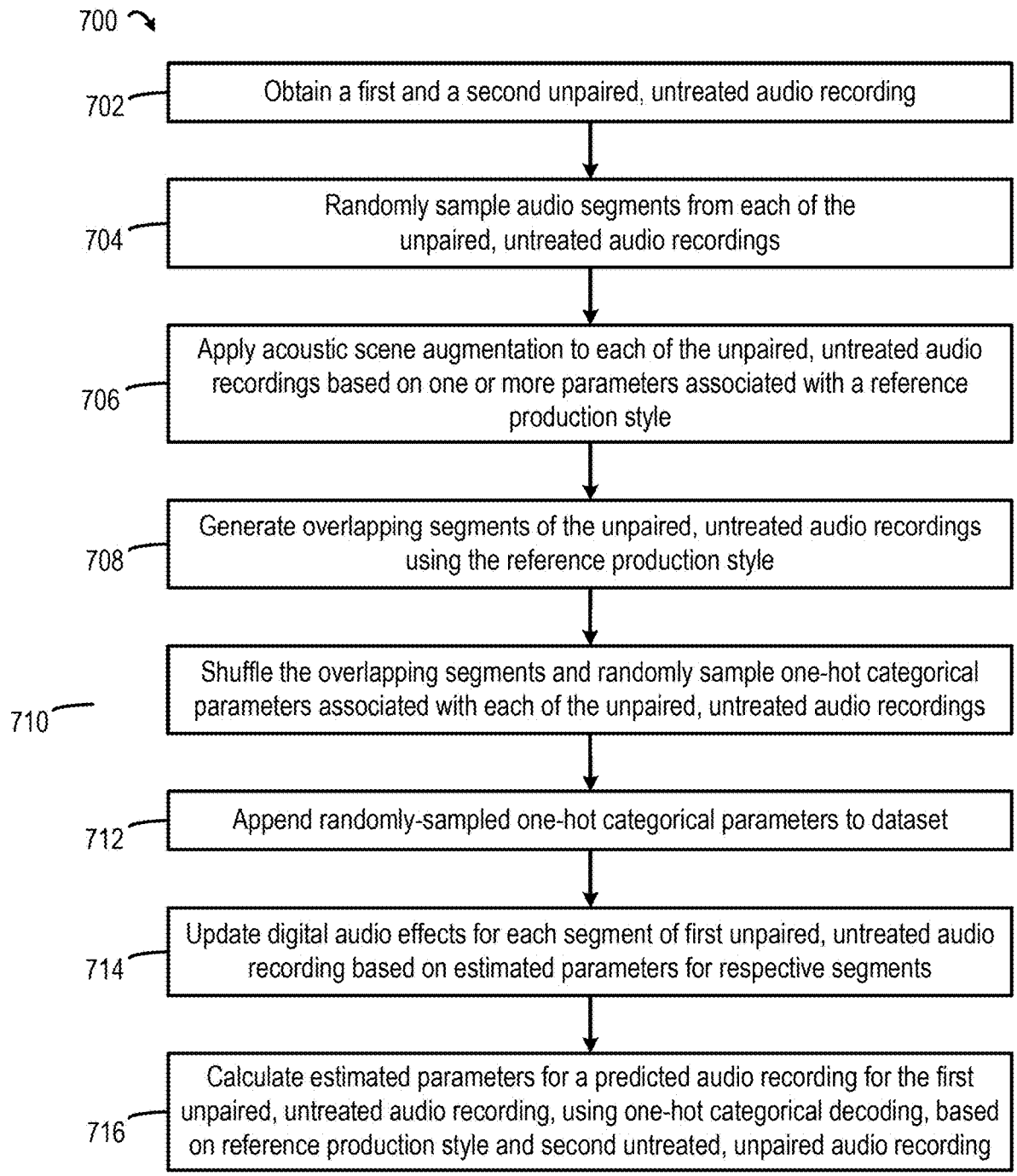
FIG. 7 depicts yet another example of a process for training a machine learning model for style transfers of an audio recording using one-shot parametric predictions, according to certain embodiments of this disclosure.

FIG. 7 is yet another example of a process 700 for training a machine learning model for a style transfer of an audio recording using one-shot parametric predictions, according to certain embodiments of this disclosure. One or more operations described with respect to FIG. 7 can be used to implement steps for training a machine learning model (e.g., machine learning models 112, 212, 312) to produce audio content according certain embodiments discussed herein. One or more processing devices (e.g., computing environment 100) implement operations depicted in FIG. 7 by executing suitable program code (e.g., machine learning model 112). For illustrative purposes, the process 700 is described with reference to certain examples depicted in the figures. Other implementations, however, are possible. In this example, the process 700 can use any of the techniques described herein optimize the machine learning model 112.

At block 702, the process 700 involves obtaining two unpaired, untreated audio recordings. In this example, the two unpaired, untreated audio recordings include a first unpaired, untreated audio recording and a second unpaired, untreated audio recording. However, it should be appreciated that the unpaired audio recording can include either of a production audio recording or an untreated audio recording. But in this example, an audio processing system 108 accesses audio database 106 to obtain training data that includes untreated audio recordings, unpaired audio recordings, and/or audio data. In one example, the audio processing system 108 obtains a corpus of training data from the audio database 106 that includes the untreated audio recording and/or unpaired audio recording. In this example, the unpaired, untreated audio recordings includes substantially the same reference style. For instance, the unpaired, untreated audio recordings can include one or more similar features, e.g., a substantially similar amount of background noise, reverberation, a similar EQ, etc.

At block 704, the process 700 involves randomly sampling audio segments from the two unpaired, untreated audio recordings. In one example, the reference production style of the untreated audio recording is a matching production style of the unpaired audio recording. In one example, the audio processing system 108 can execute a signal analysis module 110. In this example, the signal analysis module 110 can calculate a STFT using a hamming windowing function. For instance, the signal analysis module 110 can perform the STFT based on a predetermined length of 1024 samples and a predetermined step size of 128 samples. The signal analysis module 110 can use the resulting, complex-valued representation to compute a magnitude representation of the audio recordings.

At block 706, the process 700 involves applying an acoustic scene augmentation to the untreated audio recording and their corresponding segments based on one or more parameters potentially associated with the reference production style. In some examples, the audio processing system 108 can apply the acoustic scene augmentation. In some examples, the audio processing system 108 can execute the machine learning model 112 to apply the acoustic scene augmentation. In other examples, the machine learning model 112 may execute the parameter prediction engine 118 to apply the acoustic scene augmentation. In one example, the reference production style of the untreated audio recording includes the matching production style of the untreated audio recording. In this example, the machine learning model 112 can generate audio data using any of the techniques described above. In some examples, the acoustic scene augmentation can include one or more changes to one or more parameters associated with the reference production style (e.g., an amount of background noise, reverberation, frequency equalization, or another audio parameter) associated with an audio segment.

In some examples, the acoustic scene augmentation can be applied using a filter bank (an array of band-pass filters). In one example, the audio processing system 108 applies the acoustic scene information using a perfect reconstruction finite impulse response (FIR) filter bank. In some examples, the audio processing system 108 can apply the acoustic scene information using another filter bank (e.g., a fast Fourier transform (FFT) filter bank, multirate filter bank, polyphase filter bank, an oversampled filter bank, an infinite impulse response (IIR) filter bank, another type of perfect reconstruction filter bank, etc.). The changes made by the acoustic scene augmentation can effectively increase an overall size of a dataset used to train the machine learning model 112. Further, in some examples, the machine learning model 112 can apply the acoustic scene augmentation using one or more techniques described above to simulate one or more acoustic scene changes. Further, the machine learning model 112 can apply the acoustic scene augmentation that include one or more sets of acoustic scene changes (e.g., one or more predetermined combinations of acoustic scene changes).

At block 708, the process 700 involves generating overlapping segments of the untreated audio recording and the unpaired audio recording with the reference production style. In one example, the reference production style of the untreated audio recording is the matching production style. In some examples, the machine learning model 112 can determine a number of segments for each of the untreated audio recording and the unpaired audio recording. In this example, the machine learning model 112 generates a number of temporally overlapping segments for both audio recordings. In some examples, the machine learning model 112 can generate the overlapping segments based on time intervals. In some examples, the machine learning model 112 may select a time interval based on an overall length of the untreated audio recording, unpaired audio recording, or both of these. In additional or alternative examples, the machine learning model 112 can select an interval based on one or more features, a classification, a type of algorithm, a periodicity, a frequency, previous training, or any other suitable technique.

At block 710, the process 700 involves shuffling the overlapping segments and randomly sample one-hot categorical parameters of the untreated audio recording and the unpaired audio recording. In this example, the machine learning model 112 shuffles the overlapping segments to randomize a random sampling. Advantageously, the machine learning model 112 can use the same audio recordings to generate a maximal number of potential pairings of the overlapping segments. Further, the machine learning model 112 can be trained using these nearly limitless number of potential pairings to significantly reduce an overall cost of training, e.g., by requiring fewer audio recordings (e.g., less training data). In some examples, the machine learning model 112 can use a randomization algorithm such as a quick sort, a Markov chain-based Monte Carlo, a random walk, or any other suitable technique. In some examples, the machine learning model 112 can use an optimized randomization algorithm based on features associated with the overlapping segments. In addition, the machine learning model 112 can randomly sample the overlapping segments to obtain one or more one-hot categorical parameters associated with the untreated audio recording and the unpaired audio recording.

At block 712, the process 700 involves appending randomly-sampled one-hot categorical parameters to a dataset. In some examples, the machine learning model 112 can generate a dataset of parameters. In this example, the machine learning model 112 generates a dataset of one-hot categorical parameters. For example, the machine learning model 112 can initialize the dataset of one-hot categorical parameters to create an empty dataset of one-hot categorical parameters. Further, the machine learning model 112 can update the dataset of one-hot categorical parameters with the randomly-sampled one-hot categorical parameters from block 710. In addition, the machine learning model 112 can update the dataset iteratively for various pairings of overlapping segments using the nearly limitless number of potential combinations of the overlapping segments during training.

At block 714, the process 700 involves updating digital audio effects for each segment of the untreated audio recording based on estimated parameters for respective segments. In some examples, the machine learning model 112 can update prediction parameters for a particular segment, an audio recording, or an entire class using prediction parameters. In some examples, the machine learning model 112 can update prediction parameters for other segments within the untreated audio recording. For instance, the machine learning model 112 can calculate ground truth parameters associated with a particular segment. In this example, the machine learning model 112 can update prediction parameters $\Theta^{(i)}$ for the entire untreated audio recording based on the calculated ground truth parameters (e.g., estimated parameters) for the overlapping segments. Further, the machine learning model 112 can be trained iteratively, using various pairings of overlapping segments, to refine and update the prediction parameters $\Theta^{(i)}$.

At block 716, the process 700 involves calculating the estimated parameters for a predicted audio recording for the untreated audio recording, based on the reference production style and the unpaired audio recording, using one-hot categorical decoding. In some examples, the machine learning model 112 can generate prediction parameters (e.g., $\Theta^{(i)}$) based on one-hot categorical parameters. For instance, the machine learning model 112 can decode the one-hot categorical parameters from block 712 by determining one-hot parametric estimations (e.g., by calculating estimated parameters). In some examples, the machine learning model 112 can use these estimated parameters to determine prediction parameters necessary to transform the untreated audio recording into a reference style.

In one example, the machine learning model 112 uses the dataset of one-hot categorical parameters to determine prediction parameters required for transformation of the untreated audio recording into the production style of the unpaired audio recording. For instance, the machine learning model 112 can decode the dataset of the one-hot categorical parameters to determine one or more DAFX values. In some examples, the machine learning model 112 can use these DAFX values to modify one or more audio parameters associated with the untreated audio recording. In some examples, the machine learning model 112 can generate a reference style predicted audio recording by changing the one or more audio parameters of the untreated audio recording (e.g., estimated parameters). Further, in some examples, the machine learning model 112 can update prediction parameters associated with a particular reference style using the estimated parameters. For example, the machine learning model 112 can update prediction parameters for a particular classification, e.g., speech recordings, using the estimated parameters.

In one example, the steps performed by the audio processing system 108 for the process 700 can be represented by an algorithm that is shown in the table below.

TABLE 1

Data generation for self-supervised learning

Require: Speech recordings $D_f$, iteration count M
1:     Initialize empty dataset: $D_O \leftarrow \{\}$
2:     for all M do
3:         Randomly sample X and Y from $D_f$.
4:         Apply acoustic scene augmentation to X and Y.
5:         Divide X, Y into N overlapping segments $X^{(i)}$, $Y^{(i)}$.
6:         Shuffle the segments.
7:         Randomly sample $\mathcal{P}$ one-hot categorical parameters.
8:         Append the randomly sampled parameters $\mathcal{P}$ to $D_O$.
9:         Compute $\Theta^{(i)}$ by one-hot categorical decoding.
10:        Update each $Y^{(i)}$ via the DAFX using $\Theta^{(i)}$.
11:        Append the updated $Y^{(i)}$ to $D_0$.
12:     end for
13:     return Dataset: $D_O$ Here, the machine learning model 112 can generate optimized prediction parameters $\Theta^{(i)}$ by simulating a diverse set of acoustic scene changes (e.g., changes in ambient or background noise, reverberations, frequency equalization, etc.). The variables included in table 1 are substantially similar to those discussed above with respect to FIG. 3. For example, randomly-sampled inputs X and Y represent an untreated audio recording and an unpaired audio recording. Likewise, overlapping segments $X^{(i)}$, $Y^{(i)}$ represent segmented versions of scaled representations having i features corresponding to their respective inputs X and Y. Additionally, the randomly-sampled $\mathcal{P}$ one-hot categorical parameters are substantially similar to the prediction parameters $\mathcal{P}$ above. Advantageously, training the machine learning model 112 can be achieved using significantly less expertly-labeled training data that may require additional processing (e.g., human labeling).

In this example, the machine learning model 112 can generate data for audio recordings based on a particular genre of audio content. Further, table 1 shows an example of an algorithm employed by the audio processing system 108 to train the machine learning model using audio recordings that are classified as a part of a speech recording genre. In some examples, the generation of the prediction parameters $\mathcal{P}$ can be optimized by repeatedly splitting the randomly-sampled $\mathcal{P}$ one-hot categorical parameters using different overlapping segments. In one example, the self-supervised training of the machine learning model 112 can be optimized by trifurcating learning. For instance, the machine learning model 112 can trifurcate time between training, testing, and validating data for audio recordings. In one example, the machine learning model 112 trifurcates learning in equal parts. In other examples, the training time for the machine learning model 112 can be partitioned using any other suitable technique (e.g., bifurcation, percentile allocation, another partitioning technique, or a combination of these).

In some examples, categorical information (e.g., classifications, genres, sub-genres, related works, origination time periods, authorship, other categories, or a combination of these) for audio recordings may be provided from an audio source (e.g., an audio database 106 or the audio processing system 108). In other examples, the machine learning model 112 may be trained to determine categorical information associated with the audio recordings based on their respective features. Further, in some examples, the categorical information may include more than one categories or types of categories. And in some examples, the audio recordings may belong to different categories or have different types of categories.

Figure 8:
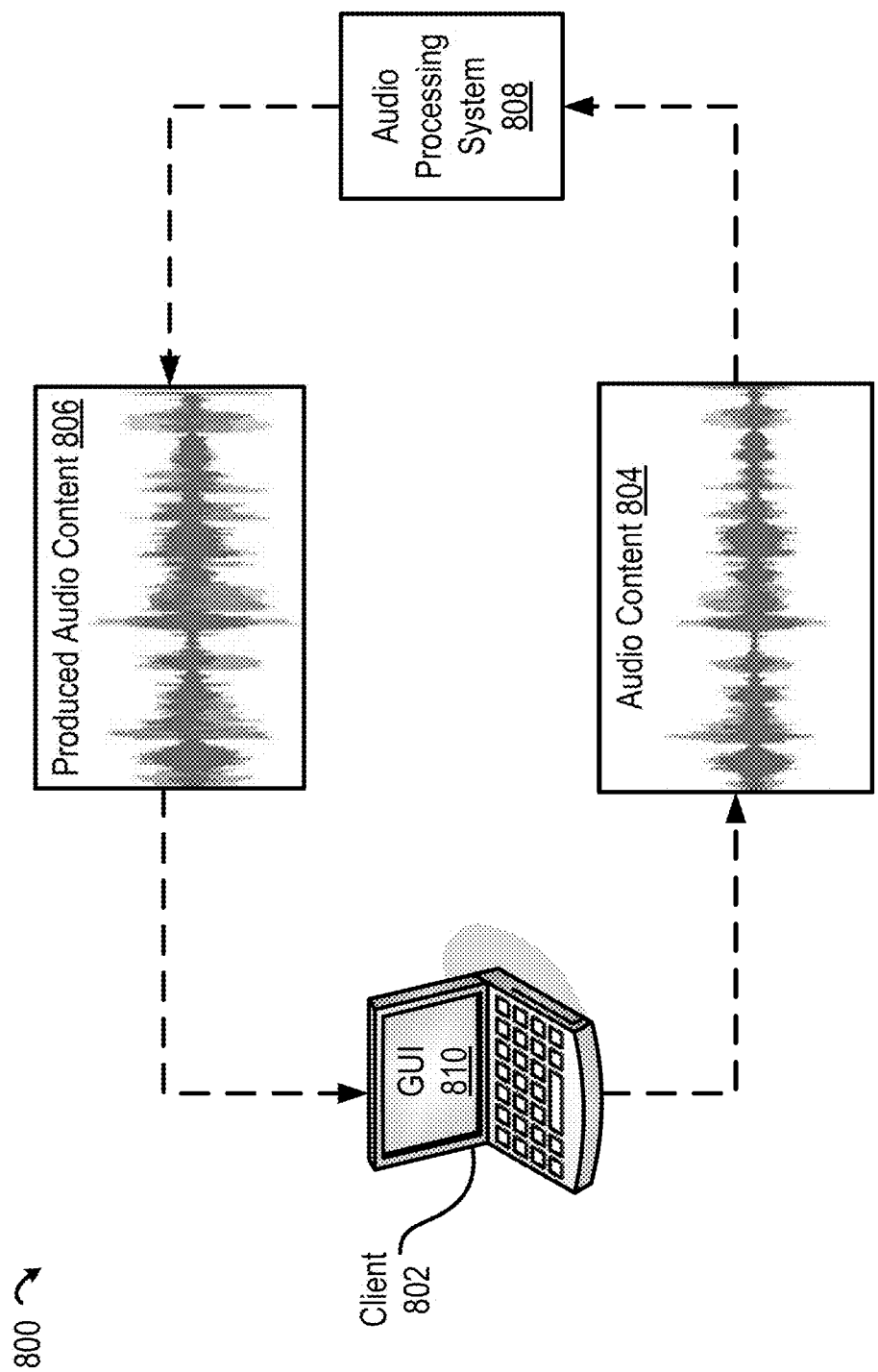
FIG. 8 depicts an example of a flow diagram for transforming audio content into produced audio content using an audio production assistant for style transfers of an audio recording using one-shot parametric predictions, according to certain embodiments of this disclosure.

Example of Transforming Audio Content with an Audio Production Assistant for Style Transfers of Audio Recordings Using One-Shot Parametric Predictions The following example is provided to illustrate a potential application of the operations described above. In particular, FIG. 8 depicts an example 800 of a flow diagram for transforming audio content into produced audio content using an audio production assistant for a style transfer of an audio recording using one-shot parametric predictions, according to certain embodiments of this disclosure. In the example 800 shown in FIG. 8, a client 802 can access the audio production assistant, e.g., via a graphical user interface (GUI) (e.g., via GUI 810). In some examples, the client 802 can communicate with one or more remote computing devices (e.g., an audio database 106 or an audio processing system 808) using a network connection (e.g., via data network 104). In this example, the client 802 transmits a request to transform audio content 804 to an audio processing system 808 using GUI 810. The audio processing system 808 can execute a machine learning model (e.g., one or more of machine learning models 112, 212, 312) that is trained to transform the audio content 804 into produced audio content (e.g., produced audio content 806). The client device 802 and the audio processing system 808 include all of the capabilities described above with respect to other client devices (e.g., client devices 102) and audio processing systems (e.g., audio processing systems 108, 208, 308).

In the example 800, the client device 802 accesses an audio production assistant by executing suitable program code for the operations described herein. For instance, the client device 802 can access the audio production assistant by launching an application associated with the audio production assistant via GUI 810. In some examples, the GUI 810 can include the audio production assistant. In some examples, the audio production assistant can include user-selectable options that correspond to one or more desirable production styles. In some examples, a user can select audio content (e.g., an audio recording) for transformation. And in some examples, the user can select the audio content and a desired production style (e.g., a target production style) for the transformation.

In some examples, the GUI 810 can include user-selectable options. For instance, the GUI 810 can include one or more icons, buttons, search bars, checkboxes, dropdowns, lists, menus, sliders, any other GUI elements capable of receiving a user input, or a combination of these. In one example, the GUI 810 allows the user to separately manipulate one or more audio parameters. For example, the GUI 810 can include user-selectable options for separate audio parameters such as DAFX, EQ, loudness, or any other audio settings disclosed herein. In some examples, these user-selectable options can allow a user to refine one or more prediction parameters corresponding to the audio parameters. Further, in some examples, the user-selectable options can allow a user to modify (e.g., adjust or otherwise alter) an available (e.g., a user-selected or selectable) target production style or reference production style.

In some examples, the audio production assistant may include a recording device. For example, the user may record audio content using the audio production assistant. In some examples, the user can access previously recorded audio content using the audio production assist or another suitable application. In some examples, the previously-recorded audio content may include one or more podcasts, audio conferences, audiovisual conferences, vlogs, audiovisual messages, audiovisual clips, music files, audiobooks, movies, still photographs with audio, graphics with audio, social media content (e.g., social media stories), or another form of multimedia content. In some examples, the user can select the target production style from a predetermined list of target production styles.

In one example, the user may have recorded live audio content that includes music. For instance, the user may be a part of a band that recorded an original musical composition. In this example, the user can enhance an audio quality level associated with the original musical composition using the audio production assistant. In one example, the user selects the target production style for the original musical composition based on a genre of music. For example, the user can use the audio production assistant and/or GUI 810 to access a list of available target production styles (e.g., a menu) associated with a desired genre of music. In one example, the user is a jazz singer and she selects an option for "music" from menu of genres for target production styles. In some examples, the user can select an option for "jazz music" from among a list of musical genres (e.g., a sub-menu). In this example, the sub-menu may include various musical genres such as pop music, jazz music, hip hop music, rhythm & blues music, heavy metal music, death metal music, classic rock & roll music, country music, folk music, and bluegrass music, among others. In some examples, one or more features or parameters associated with the user-selected target production style may be retrieved from a remote library of target production styles.

In some examples, the user may desire a target production style that is not included in the list of musical genres shown in the audio production assistant. For example, the original musical composition may include musical theatre. In this case, the user can input text, using the audio production assistant and/or GUI 810, that indicates she would like to transform the original musical composition into "theatre music" or "musical theatre." In some examples, a request for the unlisted target production style can be transmitted to a remote audio source (e.g., audio database 106 or audio processing system 808) for a search and/or retrieval of the target production style. In some examples, the audio content 804 can include an audio recording (e.g., the original musical composition), audio information (e.g., the target production style), and/or other audio data. In some examples, the audio production assistant transmits the audio content 804 to the audio processing system 808.

Continuing with the example 800, the audio processing system 808 receives the request from the client device 802. The audio processing system 808 responsively executes suitable program code (e.g., machine learning model 112) to transform the audio content 804 into the produced audio content 806. In some examples, the audio processing system 808 analyzes the audio content 804 according to one or more of the techniques discussed herein. The audio processing system 808 can provide the analyzed audio content 804 to the machine learning model 112. The machine learning model 112 is trained to transform the audio content 804 into the target production style.

In some examples, the machine learning model 112 can transform the audio content 804 into the produced audio content 806 that includes the target production style. In some examples, the target production style is determined using audio information associated with the audio content 804 (e.g., a user-selected target production style). In other examples, the machine learning model 112 can determine the target production style based on prediction parameters derived from an analysis of the audio content 804 (e.g., one or more Mel-spectrograms associated with the audio content 804). Further, in some examples, the target production style may be determined by audio processing system 808, another device (e.g., a signal analysis module 110), or a default target production style.

The machine learning model 112 transforms the audio content 804 into the produced audio content 806 using one or more parameters associated with the target production style. The machine learning model 112 performs the transformation based on the training techniques discussed herein, modifying one or more features of the audio content 804 to match the target production style (e.g., based on the one or more parameters of the production style). The machine learning model 112 can provide the produced audio content to the audio processing system 808. The audio processing system 808 can transmit the produced audio content 806 to the client device 802, e.g., via data network 104.

Figure 9:
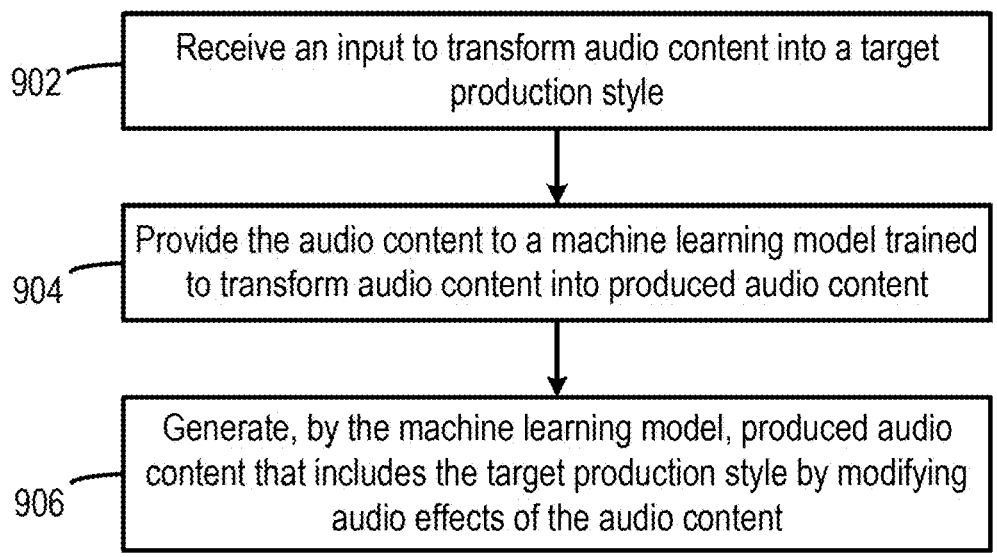
FIG. 9 depicts an example of a process for transforming audio content into produced audio content using an audio production assistant for style transfers of an audio recording using one-shot parametric predictions, according to certain embodiments of this disclosure.

Example of a Process for Transforming Audio Content with an Audio Production Assistant for Style Transfers of Audio Recordings Using One-Shot Parametric Predictions FIG. 9 is an example of a process 900 for transforming audio content into produced audio content using a machine learning model for producing audio using an audio production assistant for a style transfer of an audio recording using one-shot parametric predictions, according to certain embodiments of this disclosure. One or more operations described with respect to FIG. 9 can be used to implement steps for training a machine learning model (e.g., machine learning models 112, 212, 312) to produce audio content according certain embodiments discussed herein. One or more processing devices (e.g., computing environment 100) implement operations depicted in FIG. 9 by executing suitable program code (e.g., machine learning model 112). For illustrative purposes, the process 900 is described with reference to certain examples depicted in the figures. Other implementations, however, are possible.

At block 902, the process 900 involves receiving an input to transform audio content to a target production style. In some examples, a user may provide the input to a client device 102. In one example, an audio processing system 108 can perform a one-shot parametric style transfer by receiving the input (e.g., a request, user input, button press, graphical user interface (GUI) selection, text input, speech-to-text input, gesture, etc.) to transform the audio content from the client device 102. The client device 102 and the audio processing system 108 can include all of the capabilities described herein. In some examples, the input can include a desired target production style. And in some examples, the target production style may include a class of one-shot parameters.

At block 904, the process 900 involves providing the audio content to a machine learning model trained to transform audio content into produced audio content. In some examples, the audio processing system 108 can provide the audio content to a trained machine learning model 112. In some examples, the machine learning model 112 may be trained to transform the audio content into produced audio content according to any of the techniques discussed herein. In this example, the machine learning model 112 receives the audio content from the audio processing system 108.

At block 906, the process 900 involves generating, by the machine learning model, produced audio content that includes the target production style by modifying one or more audio effects of the audio content. In some examples, the machine learning model 112 can generate the produced audio content using a target production style from block 902. Further, the machine learning model 112 can generate the produced audio content by modifying one or more DAFX of the audio content to match the target production style. In some examples, the machine learning model 112 provides the produced audio content to the audio processing system 108. Additionally, in some examples, the audio processing system 108 can transmit the produced audio content to the client device 102 via data network 104.

Example Computing System for Audio Processing

Figure 10:
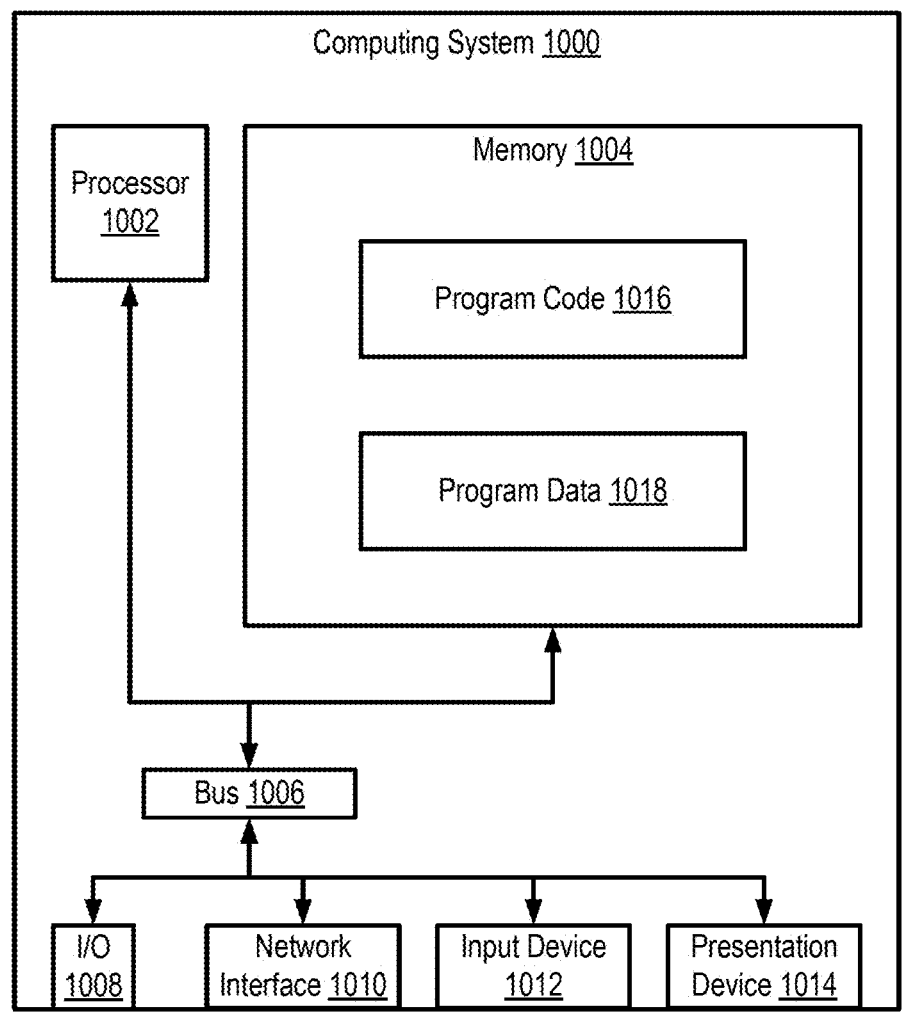
FIG. 10 an example computing system that can perform certain operations described herein, according to certain embodiments of this this disclosure.

Any suitable computing system can be used for performing the operations described herein. FIG. 10 depicts an example computing system 1000 that can perform certain operations described herein, according to certain aspects of this disclosure. In some embodiments, the computing system 1000 executes audio processing system 108 of FIG. 1. In other embodiments, separate computing systems having devices similar to those depicted in FIG. 10 (e.g., a processor, a memory, etc.) separately execute parts of the audio processing system 108.

The depicted example of a computing system 1000 includes a processor 1002 communicatively coupled to one or more memory devices 1004. The processor 1002 executes computer-executable program code 1016 stored in a memory device 1004, accesses information (e.g., program data 1018) stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as input or output devices. For example, the computing system 1000 is shown with one or more input/output ("I/O") interfaces 1008. An I/O interface 1008 can receive input from input devices (e.g., input device 1012) or provide output to output devices. One or more buses 1006 are also included in the computing system 1000. The bus 1006 communicatively couples one or more components of a respective one of the computing system 1000.

The computing system 1000 executes program code 1016 that configures the processor 1002 to perform one or more operations described herein. For example, the program code 1016 may include the machine learning model 112 (including the feature extractor 114, the comparison module 116, the parameter prediction engine 118, and the DSP operator 120), the signal analysis module 110, or other suitable applications to perform operations described herein. The program code 1016 may be resident in the memory device 1004 or any suitable computer-readable medium and may be executed by the processor 1002 or another suitable processor. In additional or alternative embodiments, the program code 1016 described above is stored in one or more other memory devices accessible via data network 104.

The computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices via data network 104 using the network interface device 1010.

In some embodiments, the computing system 1000 also includes presentation device 1014. A presentation device 1014 can include any device or group of devices for providing visual, auditory, or other suitable sensory output. Non-limiting examples of the presentation device 1014 include a touchscreen, a monitor, a speaker, a separate mobile computing device, etc. In some aspects, the presentation device 1014 can include a remote client-computing device, such as client device 102, that communicates with computing system 1000 using one or more data networks described herein. Other aspects can omit presentation device 1014.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, this disclosure has been presented for the purpose of providing examples rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, script, or other type of language or combinations of languages may be used to implement the teachings herein in software to be used in programming or configuring a computing device. The order of the blocks presented in the examples above can be varied—e.g., blocks can be re-ordered, combined, and/or broken into sub-blocks. Certain blocks or processes can be performed in parallel.

The invention claimed is:

1. A method in which one or more processing devices perform operations comprising:
receiving an input to transform audio content into a target production style;
providing the audio content to a machine learning model trained to transform the audio content into produced audio content, wherein the machine learning model is trained by:
accessing training data comprising scaled representations of untreated audio recordings and unpaired audio recordings;
generating sets of feature embeddings by extracting, in parallel, features from scaled representations of an untreated audio recording and an unpaired audio recording, wherein the unpaired audio recording comprises a reference production style, and wherein each of the sets of feature embeddings corresponds to their respective scaled representations;
generating, using a trained comparison model, a feature vector based on a comparison between the sets of feature embeddings;
computing prediction parameters using one or more learned functions, the prediction parameters configured to transform the feature vector into the reference production style of the unpaired audio recording; and
updating the machine learning model based on the prediction parameters; and
generating, by the machine learning model, the produced audio content by modifying one or more audio effects of the audio content, wherein the produced audio content comprises the target production style.

2. The method of claim 1, wherein generating the sets of feature embeddings comprises:
generating two-dimensional (2D) convolutional channels of features for each of the scaled representations of the untreated audio recording and the unpaired audio recording, wherein the 2D convolutional channels are generated by performing a 2D convolution on the scaled representations of the untreated audio recording and the unpaired audio recording using a plurality of kernels; and
normalizing each of the 2D convolutional channels by performing a 2D batch-normalization using a first scalar for an average and a second scalar for a variance.

3. The method of claim 2, wherein the first scalar is the same as the second scalar.

4. The method of claim 2, wherein generating the sets of feature embeddings further comprises:
extracting, from each of the 2D convolutional channels, the features using a leaky rectified linear unit (LReLU) activation function;

generating, for each of the 2D convolutional channels, downsampled sets of feature embeddings by applying a max-pooling operator to sets of the extracted features corresponding to respective 2D convolutional channels over time; and calculating a global average of the downsampled sets of feature embeddings to generate the sets of feature embeddings.

5. The method of claim 1, wherein generating the feature vector comprises:

concatenating the sets of feature embeddings into a two-channel matrix, wherein the two-channel matrix is configured to preserve temporal locations associated with the sets of feature embeddings.

6. The method of claim 5, wherein generating the feature vector further comprises:

performing a one-dimensional convolution on the two-channel matrix to project the two-channel matrix down to the feature vector.

7. The method of claim 6, wherein the one-dimensional convolution comprises a fixed length based on a predetermined maximum number of features.

8. The method of claim 1, wherein the target production style is the reference production style.

9. The method of claim 1, further comprising:

generating a predicted audio recording of the untreated audio recording based on the prediction parameters; and determining a quality factor for the predicted audio recording based on a variance between the predicted audio recording and the unpaired audio recording, wherein the variance comprises either a mean absolute error or a standard deviation associated with one or more quality factor parameters.

10. A system comprising:

one or more processing devices; and a non-transitory computer-readable medium communicatively coupled to the one or more processing devices and storing instructions, wherein the one or more processing devices are configured to execute the instructions and thereby perform operations comprising:

receiving an input to transform audio content into a target production style;

providing the audio content to a machine learning model trained to transform the audio content into produced audio content, wherein training the machine learning model comprises:

accessing training data comprising scaled representations of an untreated audio recordings and unpaired audio recordings;

generating sets of feature embeddings by extracting, in parallel, features from scaled representations of an untreated audio recording and an unpaired audio recording, wherein the unpaired audio recording comprises a reference production style, and wherein each of the sets of feature embeddings corresponds to their respective scaled representations;

generating, using a trained comparison model, a feature vector based on a comparison between the sets of feature embeddings;

computing prediction parameters using one or more learned functions, the prediction parameters configured to transform the feature vector into the reference production style of the unpaired audio recording; and updating the machine learning model based on the prediction parameters; and generating, by the machine learning model, the produced audio content by modifying one or more audio effects of the audio content, wherein the produced audio content comprises the target production style.

11. The system of claim 10, wherein generating the sets of feature embeddings comprises:

generating 2D convolutional channels of features for each of the scaled representations of the untreated audio recording and the unpaired audio recording, wherein the 2D convolutional channels are generated by performing a 2D convolution on the scaled representations of the untreated audio recording and the unpaired audio recording using a plurality of kernels; and normalizing each of the 2D convolutional channels by performing a 2D batch-normalization using a first scalar for an average and a second scalar for a variance.

12. The system of claim 11, wherein the first scalar is the same as the second scalar.

13. The system of claim 11, wherein generating the sets of feature embeddings further comprises:

extracting, from each of the 2D convolutional channels, the features using a LReLU activation function;

generating, for each of the 2D convolutional channels, downsampled sets of feature embeddings by applying a max-pooling operator to sets of the extracted features corresponding to respective 2D convolutional channels over time; and calculating a global average of the downsampled sets of feature embeddings to generate the sets of feature embeddings.

14. The system of claim 10, wherein generating the feature vector comprises:

concatenating the sets of feature embeddings into a two-channel matrix, wherein the two-channel matrix is configured to preserve temporal locations associated with the sets of feature embeddings.

15. The system of claim 14, wherein generating the feature vector further comprises:

performing a one-dimensional convolution on the two-channel matrix to project the two-channel matrix down to the feature vector.

16. The system of claim 15, wherein the one-dimensional convolution comprises a fixed length based on a predetermined maximum number of features.

17. The system of claim 10, the operations further comprising:

generating a predicted audio recording of the untreated audio recording based on the prediction parameters; and determining a quality factor for the predicted audio recording based on a variance between the predicted audio recording and the unpaired audio recording, wherein the variance comprises either a mean absolute error or a standard deviation associated with one or more quality factor parameters.

18. A method of training a machine learning model in which one or more processing devices perform operations comprising:

accessing training data comprising scaled representations of an untreated audio recordings and unpaired audio recordings;

generating sets of feature embeddings by extracting, in parallel, features from scaled representations of an untreated audio recording and an unpaired audio recording, wherein the unpaired audio recording comprises a reference production style, and wherein each of the sets of feature embeddings corresponds to their respective scaled representations;

generating, using a trained comparison model, a feature vector based on a comparison between the sets of feature embeddings;

computing prediction parameters using one or more learned functions, wherein the prediction parameters is configured to transform the feature vector into the reference production style of the unpaired audio recording; and updating the machine learning model based on the prediction parameters.

19. The method of claim 18, wherein generating the sets of feature embeddings comprises:

generating 2D convolutional channels of features for each of the scaled representations of the untreated audio recording and the unpaired audio recording, wherein the 2D convolutional channels are generated by performing a 2D convolution on the scaled representations of the untreated audio recording and the unpaired audio recording using a plurality of kernels;

normalizing each of the 2D convolutional channels by performing a 2D batch-normalization using a first scalar for an average and a second scalar for a variance, wherein the first scalar is the same as the second scalar;

extracting, from each of the 2D convolutional channels, the features using a LReLU activation function;

generating, for each of the 2D convolutional channels, downsampled sets of feature embeddings by applying a max-pooling operator to sets of the extracted features corresponding to respective 2D convolutional channels over time; and calculating a global average of the downsampled sets of feature embeddings to generate the sets of feature embeddings.

20. The method of claim 18, wherein generating the feature vector comprises:

concatenating the sets of feature embeddings into a two-channel matrix, wherein the two-channel matrix is configured to preserve temporal locations associated with the sets of feature embeddings; and performing a one-dimensional convolution on the two-channel matrix to project the two-channel matrix down to the feature vector, wherein the one-dimensional convolution comprises a fixed length based on a predetermined maximum number of features.

* * * * *